US012597383B2

(12) United States Patent
Chun et al.

(10) Patent No.: US 12,597,383 B2
(45) Date of Patent: Apr. 7, 2026

(54) DISPLAY PANEL AND DISPLAY DEVICE INCLUDING THE SAME

(71) Applicant: LG Display Co., Ltd., Seoul (KR)

(72) Inventors: Min Kyu Chun, Paju-si (KR); Young In Jang, Paju-si (KR); Kwang Su Lim, Paju-si (KR); Young Jun Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/965,995

(22) Filed: Dec. 2, 2024

(65) Prior Publication Data

US 2025/0252903 A1 Aug. 7, 2025

(30) Foreign Application Priority Data

Feb. 7, 2024 (KR) ........................ 10-2024-0018907

(51) Int. Cl.

*G09G 3/20* (2006.01)
*G09G 3/00* (2006.01)
*G09G 3/32* (2016.01)
*G09G 3/3225* (2016.01)

(Continued)

(52) U.S. Cl.

CPC ............... *G09G 3/32* (2013.01); *G09G 3/006* (2013.01); *G09G 3/2074* (2013.01); *G09G 3/3225* (2013.01); *G09G 3/3258* (2013.01); *G09G 3/3233* (2013.01); *G09G 2300/0426* (2013.01); *G09G 2300/0443* (2013.01); *G09G 2300/0452* (2013.01); *G09G 2300/0852* (2013.01); *G09G 2310/08* (2013.01); *G09G 2320/045* (2013.01); *G09G 2330/021* (2013.01);

(Continued)

(58) Field of Classification Search

CPC ......... G02F 1/136286; G02F 1/134345; G02F 1/1368; G02F 1/13624; H10K 59/131; H10K 59/1213; H10K 59/123; G09G 2300/0426; G09G 3/3233; G09G 2300/0452; G09G 3/3275; G09G 3/3607; G09G 2300/0819; G09G 3/2074; G09G 3/006; G09G 3/003; G09G 2300/0443; G09G 2300/0439; G09G 3/3291; G09G 2320/0673; G09G 2300/046; G09G 2320/0233; G09G 3/3648; G09G 3/3258; G09G 3/3225; G09G 2320/0295; G09G 2310/0262; G09G 3/3696; G09G 2320/029; H01L 23/528

See application file for complete search history.

(56) References Cited

U.S. PATENT DOCUMENTS

| | | | | |
|---|---|---|---|---|
| 2011/0043500 A1* | 2/2011 | Kwak | .................. | G09G 3/3208 345/206 |
| 2012/0268357 A1* | 10/2012 | Shih | ..................... | G09G 3/3607 345/88 |

(Continued)

FOREIGN PATENT DOCUMENTS

| | | |
|---|---|---|
| KR | 10-1581368 B1 | 12/2015 |
| KR | 10-2498778 B1 | 2/2023 |

*Primary Examiner* — Dismery Mercedes
(74) *Attorney, Agent, or Firm* — Fenwick & West LLP

(57) ABSTRACT

A display panel and a display device including the same is disclosed. Each of the sub-pixels in the display panel includes a pixel circuit, and a pixel control circuit configured to disable the pixel circuit in response to a voltage from a data line connected to the pixel circuit.

21 Claims, 11 Drawing Sheets

(51) Int. Cl.
*G09G 3/3233* (2016.01)
*G09G 3/3258* (2016.01)

(52) U.S. Cl.
CPC ..... *G09G 2330/08* (2013.01); *G09G 2330/10* (2013.01); *G09G 2330/12* (2013.01)

(56) References Cited

U.S. PATENT DOCUMENTS

| | | | | |
|---|---|---|---|---|
| 2014/0152640 | A1* | 6/2014 | Chen | G09G 3/3607 345/212 |
| 2015/0054722 | A1* | 2/2015 | Kanda | G09G 3/3233 345/77 |
| 2016/0086544 | A1* | 3/2016 | Park | G09G 3/3233 345/82 |
| 2018/0012546 | A1* | 1/2018 | Li | G09G 3/3258 |
| 2018/0130412 | A1* | 5/2018 | Zhang | G09G 3/3258 |
| 2020/0202786 | A1* | 6/2020 | Li | G09G 3/3258 |
| 2021/0097933 | A1* | 4/2021 | Yuan | G09G 3/3266 |
| 2021/0104185 | A1* | 4/2021 | Park | G09G 3/3266 |
| 2021/0304655 | A1* | 9/2021 | Zhang | G09G 3/2003 |
| 2023/0282163 | A1* | 9/2023 | Hamer | G09G 3/3233 345/212 |
| 2025/0209981 | A1* | 6/2025 | He | G09G 3/3233 |

* cited by examiner

DISPLAY PANEL AND DISPLAY DEVICE INCLUDING THE SAME

CROSS-REFERENCE TO RELATED APPLICATION

This application claims priority to and the benefit of Republic of Korea Patent Application No. 10-2024-0018907, filed Feb. 7, 2024, which is hereby incorporated by reference in its entirety.

BACKGROUND

Field

The present disclosure relates to a display panel and a display device including the same.

Description of Related Art

Various flat panel display devices, such as a liquid crystal display device and an electroluminescent display device, are known. The electroluminescent display device may use light emitting elements arranged in each pixel to emit light by itself without a backlight, thereby displaying an input image. The light emitting elements of the electroluminescent display device may be divided into an organic light emitting element and an inorganic light emitting element depending on the material of a light emitting layer.

Recently, a display device that uses a light emitting diode (LED), which is an inorganic light emitting element, as a light emitting element of a pixel has attracted attention as a next-generation display device. Since the LED is made of an inorganic material, it does not require a separate encapsulation layer to protect an organic material from moisture, and it has superior reliability and long lifespan compared to an organic light emitting diode (OLED). In addition, the LED has a fast light-up speed, excellent luminous efficiency, and impact resistance.

In the case of micro-LEDs, defective sub-pixels may occur due to a defect in the transfer process of the micro-LEDs. In the case of micro-LEDs, micro-LED chips on a wafer may be transferred to a substrate on which pixel circuits are formed using a donor substrate without an LED binning process. Contact failure may occur among micro-LEDs transferred to the pixel circuit substrate, or a pixel circuit may be defective. In a repair process before shipping the product, defective pixels may be turned into a dark point by laser cutting. However, adding the repair process may result in a decrease in productivity and an increase in the manufacturing cost of the panel.

SUMMARY

The present disclosure aims to solve the above-described necessity and/or problems.

The present disclosure provides a display panel capable of turning sub-pixels into dark points without a separate repair process, and a display device including the same.

The problem to be solved by the present disclosure is not limited to those mentioned above, and other problems not mentioned will be clearly understood by those skilled in the art from the following description.

In one embodiment, a display panel comprises: a plurality of data lines; a plurality of gate lines intersecting the plurality of data lines; a plurality of power lines; and a plurality of pixels, each of the plurality of pixels including a plurality of sub-pixels, wherein each of the plurality of sub-pixels includes: a pixel circuit including a light emitting element; and a pixel control circuit connected to the pixel circuit, the pixel control circuit configured to disable the pixel circuit according to a voltage from a data line from the plurality of data lines that is connected to the pixel circuit.

In one embodiment, a display device comprises: a display panel including a plurality of data lines, a plurality of gate lines that intersect the plurality of data lines, a plurality of power lines, and a plurality of pixels that each include a plurality of sub-pixels; a data driver configured to output to the plurality of data lines at least one of a pixel driving voltage to drive the plurality of pixels to display an image and a neutralize voltage to disable at least one of the plurality of sub-pixels; a gate driver configured to supply a gate signal to the plurality of gate lines, wherein each of the plurality of sub-pixels includes: a pixel circuit connected to a corresponding data line from the plurality of data lines, the pixel circuit including a light emitting element; and a pixel control circuit connected to the pixel circuit, the pixel control circuit configured to disable the pixel circuit in response to the neutralize voltage being output by the corresponding data line.

In one embodiment, a display device comprises: a display panel including a plurality of data lines, a plurality of gate lines that intersect the plurality of data lines, a plurality of power lines, and a plurality of pixels that each include a plurality of sub-pixels; a data driver configured to output to the plurality of data lines at least one of a pixel driving voltage to drive the plurality of pixels to display an image and a neutralize voltage to disable at least one of the plurality of sub-pixels; a gate driver configured to supply a gate signal to the plurality of gate lines, wherein a sub-pixel from the plurality of sub-pixels includes: a pixel circuit connected to a corresponding data line from the plurality of data lines, the pixel circuit including a driving transistor and a light emitting element that is connected to the driving transistor; and a pixel control circuit connected to the pixel circuit, the pixel control circuit configured to disable one of the driving transistor or the light emitting element responsive to the neutralize voltage being output by the corresponding data line.

According to the embodiments of the present disclosure, the light-emitting elements may be driven at high efficiency and high luminance to improve lifetime and enable low power driving, and a plurality of sub-pixels of the same color within one pixel may be arranged to respond effectively to the improvement of defects in the light-emitting elements or pixel circuit, thereby improving process optimization and yield of the display panel.

According to the embodiments of the present disclosure, when a defective sub-pixel identified in an inspection process and a progressive defect in which a normal sub-pixel is converted into a defective sub-pixel due to stress accumulation over the driving history are sensed, the defective sub-pixels may be turned into dark points without a separate repair process.

The effects of the present disclosure are not limited to the above-mentioned effects, and other effects that are not mentioned will be apparently understood by those skilled in the art from the following description and the appended claims.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
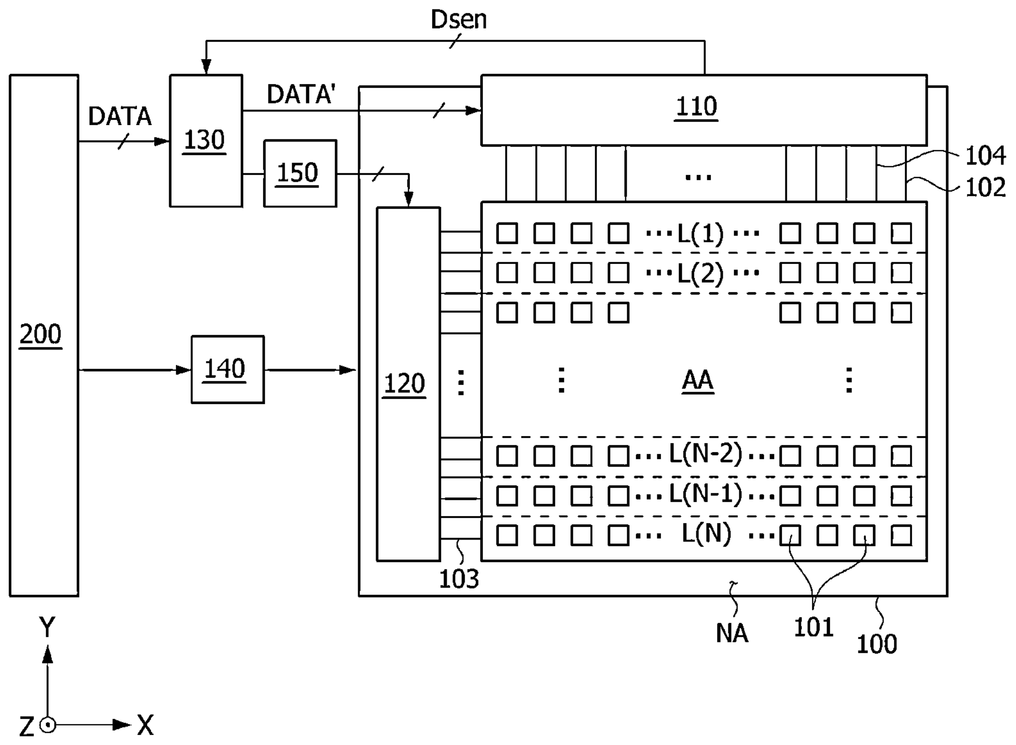
FIG. 1 is a block diagram illustrating a display device according to one embodiment of the present disclosure.

The advantages and features of the present disclosure and methods for accomplishing the same will be more clearly understood from embodiments described below with reference to the accompanying drawings. However, the present disclosure is not limited to the following embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When a positional or interconnected relationship is described between two components, such as "on top of," "above," "below," "next to," "connect or couple with," "crossing," "intersecting," or the like, one or more other components may be interposed between them, unless "immediately" or "directly" is used.

When a temporal antecedent relationship is described, such as "after", "following", "next to", "before", or the like, it may not be continuous on a time base unless "immediately" or "directly" is used.

The terms "first," "second," and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

The pixel circuit of the display device may include a plurality of transistors. The transistors may be implemented as an oxide thin film transistor (TFT) including an oxide semiconductor, a low temperature poly silicon TFT (LTPS TFT) including a low temperature poly silicon, and the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage VGH, and the gate-off voltage may be a gate low voltage VGL. In the case of a p-channel transistor, the gate-on voltage may be the gate low voltage VGL, and the gate-off voltage may be the gate high voltage VGH.

Hereinafter, various embodiments of the present disclosure will be described in detail with reference to the accompanying drawings.

FIG. 1 is a block diagram illustrating a display device according to one embodiment of the present disclosure.

Referring to FIG. 1, the display device according to an embodiment of the present disclosure includes a display panel 100, a display panel driving circuit for writing pixel data to pixels of the display panel 100, and a power supply 140 for generating power necessary for driving the pixels and the display panel driving circuit.

The display panel 100 may be implemented as a non-transmissive display panel or a transmissive display panel. The transmissive display panel may be employed in a transparent display device in which an image is displayed on a screen and an actual object is visible beyond the display panel. The display panel 100 may be made as a flexible display panel. Additionally, the display panel 100 may be made of a stretchable panel that may be stretched.

The display panel 100 may be a panel having a rectangular structure with a length in the X-axis direction, a width in the Y-axis direction, and a thickness in the Z-axis direction. A display area AA of the display panel 100 includes a pixel array for displaying an input image thereon. The pixel array includes a plurality of data lines 102, a plurality of gate lines 103 intersected with the data lines 102, a plurality of sensing lines 104, and pixels arranged in a matrix form. The display panel 100 may further include power lines commonly connected to the pixels. The power lines may be commonly connected to pixel circuits and supply a voltage required for driving the pixels 101 to the pixels 101. The power lines may be implemented as long stripes of wires along either X-axis direction or Y-axis direction, or as mesh wires in which wires in the X-axis direction and wires in the Y-axis direction are electrically connected.

The data lines 102 are arranged in the form of long wires along the Y-axis direction of the display panel 100 and are electrically connected to data channel terminals of a data driver 110. The sensing lines 104 are arranged on the display panel in parallel with data lines 102 and may be connected to sub-pixels and to sensing channel terminals of the data driver 110. The gate lines 103 are arranged in the form of long wires along the X-axis direction of the display panel 100 to intersect the data lines 102 and are electrically connected to output terminals of the gate driver 120.

Each of the pixels 101 may be divided into a red sub-pixel, a green sub-pixel, and a blue sub-pixel for color implementation. Each of the pixels may further include a white sub-pixel. Each sub-pixel includes a pixel circuit for driving a light-emitting element. Each of the pixel circuits may be connected to the data line, the gate line, the power line, the sensing line, and a neutralize reference voltage line.

The pixel array includes a plurality of pixel lines L1(1) to L(N). Where Nis a natural number greater than or equal to 2. Each of the pixel lines L1(1) to L(N) includes one line of pixels arranged along the line direction (X-axis direction) in the pixel array of the display panel 100. The pixels arranged in one pixel line may share a gate line 103. The sub-pixels arranged in the column direction (Y-axis direction) along a data line direction may share the same data line 102. One horizontal period is a time obtained by dividing one frame period by the total number of pixel lines L1(1) to L(N).

The power supply 140 adjusts the level of a direct current voltage Vin inputted from a host system 200 to output a first voltage V1 necessary to drive the pixel array of the display panel 100 and the display panel driving circuit. The power supply 140 may include a direct current to direct current converter (DC-DC converter). The DC-DC converter may include a charge pump, a regulator, a buck converter, a boost converter, and the like. The power supply 140 may output a constant voltage (or direct current voltage), such as a gamma reference voltage, a gate high voltage, a gate low voltage, a pixel power voltage, a pixel ground voltage (hereinafter referred to as a "ground voltage"), a reference voltage, or a neutralize reference voltage etc., through the use of the DC-DC converter. The gamma reference voltage is supplied to the data driver 110. The dynamic range of the data voltage outputted from the data driver 110 is determined by the voltage range of the gamma reference voltage. A voltage level of the data voltage is selected by a grayscale value of the pixel data. The dynamic range of the data voltage has the range of voltages between the maximum voltage and the minimum voltage of a data voltage. The range of the output voltage of the data driver 110 may have a voltage range that is greater than the dynamic range of the data voltage.

The gate-high voltage and the gate-low voltage are supplied to a level shifter 150 and the gate driver 120. The constant voltages such as the pixel power voltage, the ground voltage, the reference voltage, and the neutralize reference voltage are supplied to the pixels 101 through the power lines commonly connected to the pixels 101.

The display panel driving circuit writes the pixel data of the input image to the pixels of the display panel 100 under the control of the timing controller 130. The display panel driving circuit includes the data driver 110, the gate driver 120, and a sensing part 160.

The display device includes a sensing circuit. The sensing circuit provides digital data (hereinafter referred to as "sensing data") to the timing controller 130 corresponding to a sensing voltage obtained from the sub-pixels using the data driver 110, the gate driver 120, and the sensing line 104 connected to the sub-pixels.

The display panel driving circuit may further include a touch sensor driver for driving touch sensors. The touch sensor driver is omitted from FIG. 1. The data driver 110 and the touch sensor driver may be integrated into one drive IC (Integrated Circuit).

The data driver 110 outputs a pixel driving voltage to drive the sub-pixels and a neutralize voltage to disable the sub-pixels to the data lines. The pixel driving voltage may include a data voltage corresponding to the pixel data of the input image. The neutralize voltage is different from the pixel driving voltage.

The data driver 110 receives the pixel data of the input image received as a digital signal from the timing controller 130 and outputs the data voltage to the data lines 102. The data voltage corresponding to the pixel data may be the pixel driving voltage. The data driver 110 may convert neutralize data to the neutralize voltage and output it to the data line 102 connected to the sub-pixel to be darkened.

The data driver 110 includes data channels that are electrically connected to the data lines 102 and that output the data voltage Vdata, and sensing channels that are electrically connected to the sensing lines 104 and that receive sensing voltage.

The data channels of the data driver 110 convert the pixel data DATA' of the input image into gamma compensation voltage using a digital to analog converter (hereinafter referred to as "DAC") and output the data voltage of the pixel data. The gamma reference voltage is divided by a voltage divider circuit into a gamma compensation voltage for each grayscale. The gamma compensation voltage for each grayscale is provided to the DAC in the data driver 110. The data voltage is outputted via an output buffer from each of the channels of the data driver 110.

The sensing channels of the data driver 110 include an analog to digital converter (ADC). The sensing channels convert the sensing voltage received through the sensing lines 104 into digital data by using the ADC and output sensing data Dsen. The sensing data Dsen is sent to the timing controller 130.

The gate driver 120 may be disposed in the non-display area NA on at least one of the right or left sides outside the display area AA in the display panel 100, or at least a portion thereof may be disposed within the display area AA.

The gate driver 120 may be disposed in the non-display areas NA on both sides of the display panel 100 with the display area AA of the display panel interposed therebetween, and may supply gate pulses from both sides of the gate lines 103 in a double feeding method. In another embodiment, the gate driver 120 may be disposed in at least one side of the left and right non-display areas BZ of the display panel 100 to supply a gate signal to the gate lines 103 in a single feeding method. The gate driver 120 sequentially outputs pulse of the gate signal to the gate lines 103 under the control of the timing controller 130. The gate driver 120 may shift the pulse of the gate signal using a shift register to sequentially supply them to the gate lines 103.

The timing controller 130 receives digital video data of the input image and a timing signal synchronized with the digital video data from the host system 200. The timing signal may include a vertical synchronization signal Vsync, a horizontal synchronization signal Hsync, and a data enable signal DE. A vertical period and a horizontal period may be identified by a method of counting the data enable signal DE and thus the vertical synchronization signal Vsync and the horizontal synchronization signal Hsync may be omitted. The horizontal synchronization signal Hsync and the data enable signal DE have a period of one horizontal period (1H).

The timing controller 130 generates a data timing control signal for controlling the operation timing of the data driver 110 and a gate timing control signal for controlling the operation timing of the gate driver 120 based on the timing signals Vsync, Hsync, and DE received from the host system 200. The timing controller 130 synchronizes the data driver 110 and the gate driver 120 by controlling the operation timing of the display panel driving circuit.

The gate timing control signal output from the timing controller 130 may be input to the shift register of the gate driver 120 through the level shifter 150. The level shifter 150 gate a voltage of the signal received from the timing controller 130 to a swing width between the gate high voltage and the gate low voltage and output the start pulse and the shift clock. The start pulse and the shift clock of the gate timing signal are input to the gate driver 120.

The display panel driving circuit writes the pixel data of the input image into the pixels 101 by scanning the pixels in the display mode under the control of the timing controller 130. In the display mode, the input image is reproduced on the display area AA. The sensing circuit may sense each sub-pixel in the display area AA in the sensing mode, thereby sensing the electrical characteristics of the driving transistors in all of the sub-pixels, such as the threshold voltage, in real time, and sensing the sub-pixel to be darkened.

Figure 2:
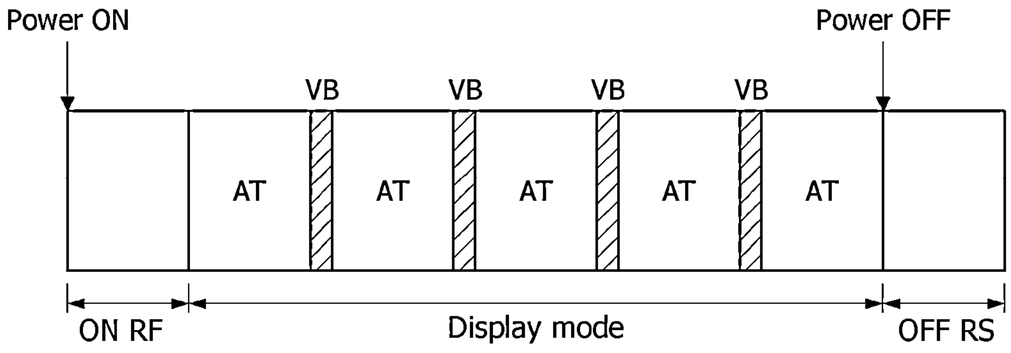
FIG. 2 is a diagram illustrating a time to enter a sensing mode in a driving sequence of a display device.

The display device may enter the sensing mode in at least one of the following sequences: a power on sequence (ON RF) at which a power begins to apply to the display device, a vertical blank time VB within the display time, and a power off sequence (OFF RS) at which a power-off switch of the display device is turned on, as shown in FIG. 2. The vertical blank time VB is a blank period, excluding an active period AT, during which the pixel data of the input image is written to the pixels within a one-frame period. During the vertical blank time VB, no pixel data is inputted to the data driver 110 and no pixel data is written to the sub-pixels. In the display mode, every frame period, during the active period AT, the pixel data DATA' is input to the data driver 110, and the data voltage output from the data driver 110 is charged with the sub-pixels so that the pixel data is written to the sub-pixels.

In the power-off sequence (OFF RS), the display panel driving circuit may be continue to drive for a predetermined period of time after the power-off switch is turned on by the user to sense the threshold voltage of the driving transistor in each of the sub-pixels, and then stop the driving when the direct current input voltage (Vin) applied to the power supply 140 from the host system 200 is cut off. In the sensing mode, sensing data Dsen output from the sensing channels of the data driver 110 electrically connected to the sensing line 104 is transmitted to the timing controller 130.

A compensation value to compensate for the initial electrical characteristic of the driving transistor in each of the sub-pixels may be pre-stored in a look-up table memory that is accessible by the timing controller 130. The compensation value stored in the look-up table memory may be stored for each sub-pixel. The timing controller 130 may update the compensation value of each of the sub-pixels in the lookup table memory based on the sensing data Dsen received from the sensing channel of the data driver 110, i.e., the sensing value, in the sensing mode. The lookup table memory may be, but is not limited to, a NAND flash memory or an electrically erasable programmable ROM (EEPROM).

The look-up table memory may output the compensation value stored at an address that is pointed to by the sensing data Dsen when the sensing data Dsen is input. The timing controller 130 may update the threshold voltage for each sub-pixel by writing the sensing data Dsen received from the ADC in sensing mode to the lookup table memory.

The timing controller 130 may modulate the pixel data by adding or multiplying the pixel data of the input image with a compensation value for compensating for deviations or changes in the electrical characteristics of the driving transistor for each sub-pixel. The compensation value may be obtained for each sub-pixel as a sensing value sensed for each sub-pixel or an operation result in which a preset parameter is reflected in the sensing value. Pixel data DATA' modulated by the timing controller 130 may be transmitted to the data driver 110 for writing to the sub-pixels in the display mode.

In the display mode, the pixel data DATA' modulated by the timing controller 130 is transmitted to the data driver 110 for writing to the sub-pixels. The data driver 110 converts the pixel data DATA' received from the timing controller 130 to a data voltage Vdata and outputs the converted data voltage Vdata.

When the sensing data Dsen sensed in each of the sub-pixels, i.e., the sensing value, is an overflow or underflow value outside the normal operating range of the sub-pixel, the timing controller 130 determines that the sub-pixel from which the sense value was obtained is a defective sub-pixel and stores the neutralize data for turning that sub-pixel into a dark point in the lookup table memory. As a result of counting the pixel data of the input image, the timing controller 130 modulates (or replaces) the pixel data to be written to the sub-pixel to be darkened (or defective sub-pixel) with the neutralize data and transmits the neutralize data to the data driver 110. The data driver 110 may convert the neutralize data to the neutralize voltage and output the neutralize voltage. The sub-pixel to be darkened to which the neutralize voltage is applied does not emit light because no current is generated from the driving transistor. Therefore, according to the present disclosure, a defective sub-pixel that has occurred due to stress accumulation may be automatically turned into a dark point without a separate repair process. The neutralize voltage may be interpreted as either a neutralize data voltage or a darkening voltage.

After the product of the display panel 100 is shipped, the display panel may be handed over to a set maker. In the set maker, a host system is connected to the display panel driving circuit of the display panel 100, and the display panel is completed as a user-usable product. After the product of the display panel 100 is shipped, an electrical characteristic of the driving transistor DR, for example, a threshold voltage may be sensed in each of the sub-pixels. In the display device, the stress of the driving transistor DR is accumulated in each of the sub-pixels in the display mode, thus changing the electrical characteristic of the driving transistor DR, for example, the threshold voltage. The sensing circuit may sense the electrical characteristic of the driving transistor DR in the sensing mode, and the timing controller 130 may modulate the pixel data with a compensation value selected based on the sensing value to compensate for changes in the electrical characteristic of the driving transistor DR, thereby preventing image quality degradation and extending the lifetime of the display device.

When the user uses the product after the product of the display panel 100 is shipped, the timing controller 130 may turn the sub-pixel to be darkened into a dark point by transmitting to the data driver 110 the neutralize data updated in the lookup table according to the sensing value of each of the sub-pixels obtained in the sensing mode. Accordingly, the defective sub-pixel caused by stress accumulation may be automatically turned into the dark point without any repair process while the user is using the display device.

Figure 3:
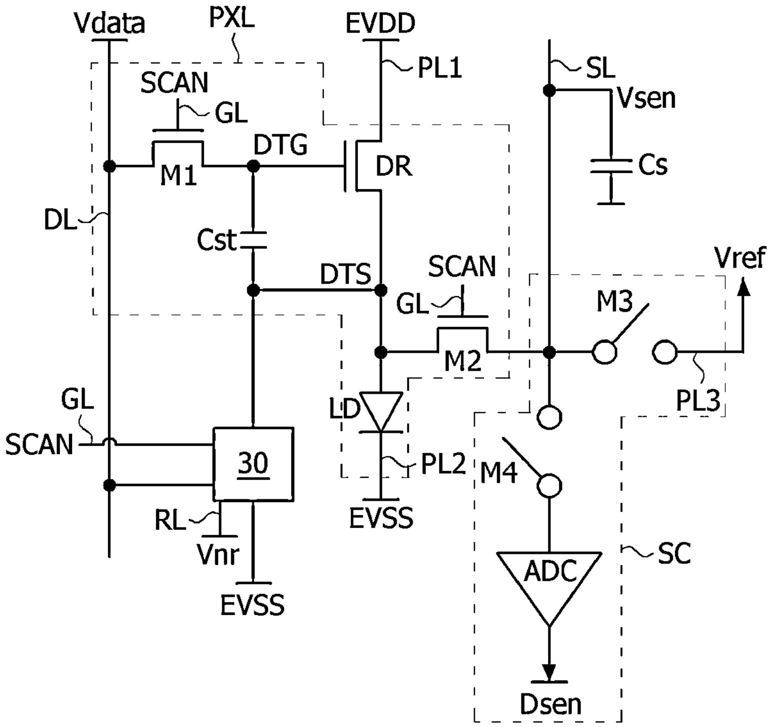
FIG. 3 is a circuit diagram illustrating a sub-pixel according to one embodiment of the present disclosure.

FIG. 3 is a circuit diagram illustrating a sub-pixel according to one embodiment of the present disclosure.

Referring to FIG. 3, the sub-pixel may include a pixel circuit PXL, a sensing circuit SC, and a pixel control circuit 30.

The pixel circuit PXL drives a light-emitting element LD according to the pixel data of the input image. The pixel circuit PXL may include the light emitting element LD, a driving transistor DR, a capacitor Cst, a first switch transistor M1, and a second switch transistor M2.

The sensing circuit SC may include an ADC, a third switch transistor M3, and a fourth switch transistor M4. The driving transistor DR and the switch transistors M1 to M4 may be implemented as, but are not limited to, an n-channel transistor. The ADC and the switch transistors M3 and M4 of the sensing circuit may be disposed in a sensing channel of the data driver 110.

The pixel circuit PXL is connected to a first power line PL1 to which a pixel power voltage EVDD is applied, a second power line PL2 to which a ground voltage EVSS is applied, and a sensing line SL to which a reference voltage Vref is applied. The pixel power voltage EVDD may be set to, but is not limited to, the voltage at which the driving transistor DR operates in its saturation region, for example, 20 V. The pixel power voltage EVDD is a voltage higher than the maximum voltage of the data voltage Vdata. The ground voltage EVSS and the reference voltage Vref are voltages that are lower than the pixel power voltage EVDD and lower than the minimum voltage of the data voltage Vdata. The ground voltage EVSS may be 0 V and the reference voltage Vref may be 1 V to 2 V, but are not limited thereto.

The pixel circuit PXL is connected to a data line DL to which the data voltage Vdata is applied, to a gate line GL to which a gate signal SCAN is applied, and a sensing line SL. The pulse of the gate signal SCAN swings between a gate-high voltage (hereafter referred to as the "gate-on voltage") and a gate-low voltage (hereinafter referred to as the "gate-off voltage").

The driving transistor DR drives the light-emitting element LD by supplying a current to the light-emitting element LD according to a gate-source voltage Vgs thereof. The voltage between a first node DTG and a second node DTS is the gate-source voltage of the driving transistor DR. The driving transistor DR includes a first electrode connected to the first power line PL1 to which the pixel power voltage EVDD is applied, a gate electrode connected to the first node DTG, and a second electrode connected to the second node DTS. The capacitor Cst is connected between the first node DTG and the second node DTS.

The light-emitting element LD may include an anode electrode, a cathode electrode, and a light emission layer. An anode electrode of the light-emitting element LD may be connected to the second node DTS. A cathode electrode of the light-emitting element LD may be connected to the second power line PL2 to which the ground voltage EVSS is applied. The light-emitting element LD may be, but is not limited to, a light-emitting element such as an OLED, mini-LED, micro-LED, or the like. The mini-LED or the micro-LED may have a vertical structure in which electrodes are arranged on the top and bottom of a semiconductor chip on which the light-emitting element LD is integrated. The semiconductor chip in which the light-emitting element LD is integrated may be implemented in a lateral structure or a flip chip structure. The light-emitting element LD and the driving transistor DR may be connected in series between the pixel power voltage EVDD and the ground voltage EVSS.

The first switch transistor M1 is connected between the data line DL and the first node DTG and is turned on in response to the gate-on voltage of the gate signal SCAN. When the first switch transistor M1 is turned on, the data line DL is electrically connected to the first node DTG. The first switch transistor M1 includes a first electrode connected to the data line DL, a gate electrode connected to the gate line GL to which the gate signal SCAN is applied, and a second electrode connected to the first node DTG.

The second switch transistor M2 is connected between the second node DTS and the sensing line SL and is turned on in response to the gate-on voltage of the gate signal SCAN. When the second switch transistor M2 is turned on, the second node DTS is electrically connected to the sensing line SL. The second switch transistor M2 includes a first electrode connected to the second node DTS, a gate electrode connected to the gate line GL to which the gate signal SCAN is applied, and a second electrode connected to the sensing line SL. A capacitor Cs in which a sensing voltage Vsen is stored may be connected to the sensing line SL. The capacitor Cs may be formed as a parasitic capacitance connected to the sensing line SL or as a separate capacitor connected to the sensing line SL.

The third switch transistor M3 is connected between the sensing line SL and a third power line PL3, to which the reference voltage Vref is applied, and may be turned on in the sensing mode under the control of the timing controller 130. When the third switch transistor M3 is turned on, the reference voltage Vref may be applied to the sensing line SL to initialize the sensing line SL to the reference voltage Vref.

The fourth switch transistor M4 may be connected between the sensing line SL and the ADC and may be turned on in the sensing mode under the control of the timing controller 130. When the fourth switch transistor M4 is turned on, a voltage Vsen sensed from the second node DTS of the pixel circuit is input to the ADC through the sensing line SL and the fourth switch transistor M4.

The ADC converts the sensing voltage Vsen into the digital data and outputs sensing data Dsen. Meanwhile, a sample & hold circuit, an amplifier, an integrator, and the like may be added between the fourth switch transistor M4 and the ADC.

The pixel control circuit 30 may allow a sub-pixel to be turned into a dark point by selectively disabling the pixel circuit PXL according to the voltage level of the data voltage. For example, the pixel control circuit 30 may be turned on in a sub-pixel to be darkened that is found to be defective in an inspection process before shipping a product and in a sub-pixel to be darkened that is detected to be defective by the sensing circuit SC after shipping the product, thereby controlling the driving transistor DR to be in the off state. On the other hand, the pixel control circuit 30 is disabled in a normal sub-pixel and does not effect on the driving of the normal sub-pixel. The pixel control circuit 30 may be interpreted as a neutralize circuit or a darkening circuit.

The pixel control circuit 30 may receive the gate signal SCAN, a neutralize reference voltage Vnr, and the ground voltage EVSS and may be connected to the data line DL. The pixel control circuit 30 may be turned on when a neutralize voltage is applied to the data line DL to control the driving transistor DR to an off state. Accordingly, the sub-pixel in which the pixel control circuit 30 is turned on is turned into a dark point because the light-emitting element LD cannot be emitted.

The neutralize reference voltage Vnr may be set as a reference voltage for distinguishing between the on/off conditions of the pixel control circuit 30 in a normal sub-pixel and a sub-pixel to be darkened. The neutralize reference voltage Vnr may be commonly applied to all of the sub-pixels through a neutralize reference voltage line RL connected to the sub-pixels, but is not limited thereto.

Figure 4:
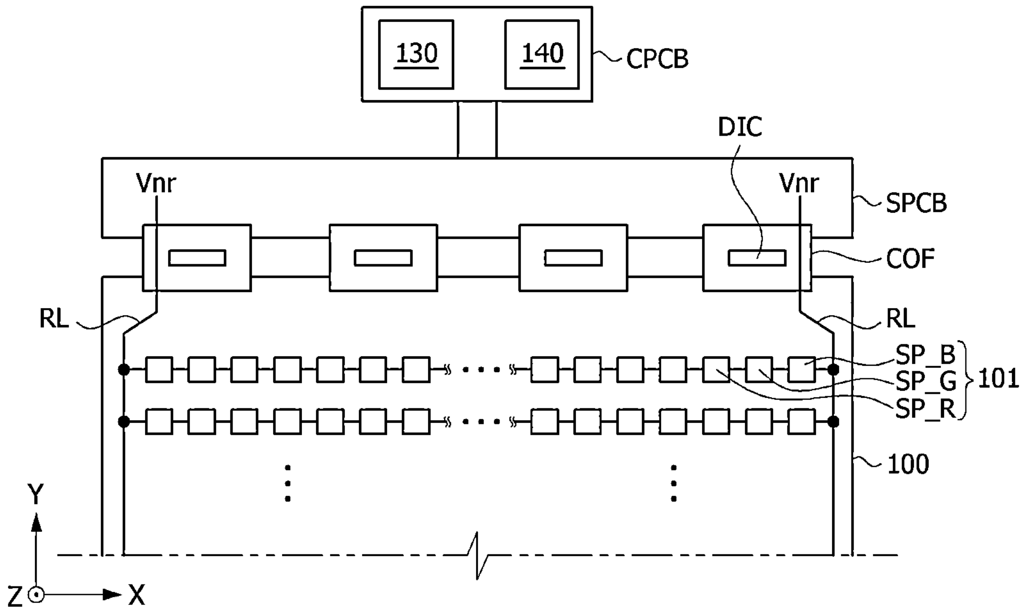
FIG. 4 is a diagram illustrating an example of a path to which a neutralize reference voltage is applied.

FIG. 4 is a diagram illustrating an example of a path to which the neutralize reference voltage is applied.

Referring to FIG. 4, the display device may include a control board CPCB, a source board SPCB, and a chip on film COF that are electrically connected to the display panel 100. A source drive IC (DIC) in which the circuit of the data driver 110 is integrated may be mounted on a flexible film of the COF.

The control board CPCB may include the timing controller 130, the power supply 140, and the like. The control board CPCB may be electrically connected to the source board SPCB through flexible circuits such as flexible flat cables (FFC) and flexible printed circuit boards (FPCB) and connectors. The level shifter 150 may be mounted on the control board CPCB or the source board SPCB.

The circuit of the data driver 110 is integrated in the source drive IC (DIC). The COF may be connected between the source board SPCB and the display panel 100 to electrically connect the source board SPCB to the display panel 100 and to supply the data voltage output from the source drive IC (DIC) to the data lines on the display panel 100.

The neutralize reference voltage Vnr output from the power supply 140 is supplied to the display panel 100 through the source board SPCB and a dummy channel line of the COF. The display panel 100 includes the neutralize reference voltage line RL that supplies the neutralize reference voltage Vnr to sub-pixels SP_R, SP_G, and SP_B. The neutralize reference voltage line RL may be connected to a routing line disposed in the non-display area NA of the display panel 100 and connected to sub-pixels SP_R, SP_G, and SP_B of the display area AA by branching from the routing line to each of the pixel lines.

Figure 5:
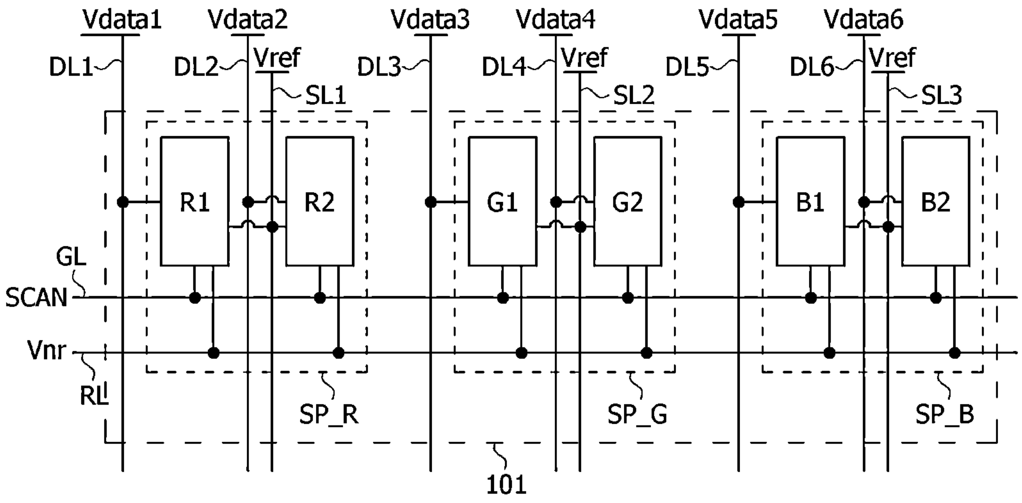
FIG. 5 is a diagram illustrating a sub-pixel configuration of one pixel according to one embodiment of the present disclosure.

FIG. 5 is a diagram illustrating a sub-pixel configuration of one pixel according to one embodiment of the present disclosure.

Referring to FIG. 5, each of the pixels 101 may include at least a sub-pixel SP_R of a first color, a sub-pixel SP_G of a second color, and a sub-pixel SP_B of a third color. The first color may be red, the second color may be green, and the third color may be blue, but are not limited thereto.

The sub-pixel SP_R of the first color may include first-first and first-second sub-pixels R1 and R2. The sub-pixel SP_G of the second color may include the second-first and second-second sub-pixels G1 and G2. The sub-pixel SP_B of the third color may include third-first and third-second sub-pixels B1 and B2. Thus, each sub-pixel includes a primary sub-pixel and a secondary sub-pixel. The sub-pixels R1 to B2 may be commonly connected to the gate line GL and the neutralize reference voltage line RL to share the gate line GL and the neutralize reference voltage line RL.

The sub-pixels R1 to B2 may be connected to different data lines DL1 to DL6 to supply independent data voltages Vdata1 to Vdata6, respectively. The first-first and first-second sub-pixels R1 and R2 may be commonly connected to a first sensing line SL1 to share the first sensing line SL1. The second-first and second-second sub-pixels G1 and G2 may be commonly connected to a second sensing line SL2 to share the second sensing line SL2. The third-first and third-second sub-pixels B1 and B2 may be commonly connected to a third sensing line SL3 to share the third sensing line SL3.

Figure 6A:
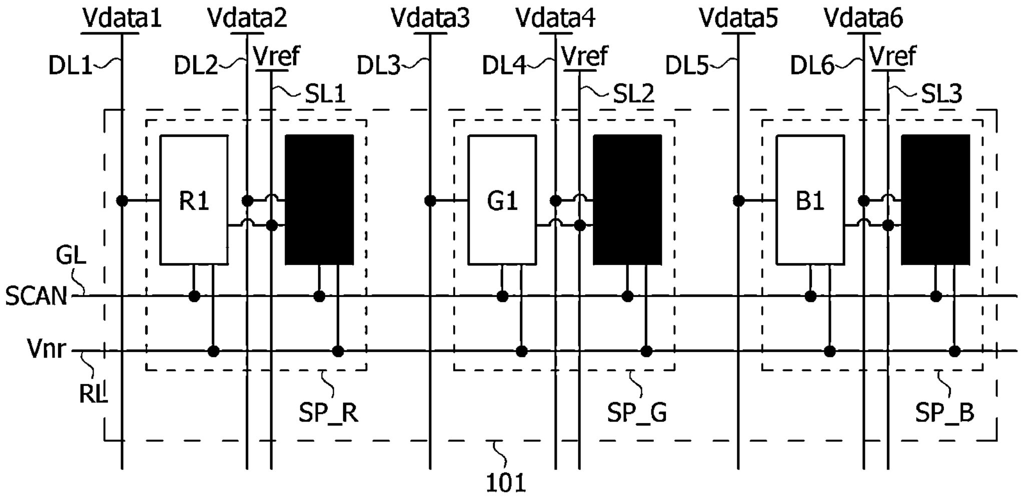
FIGS. 6A and to 6B are diagrams illustrating an example of a sensing operation for the pixel shown in FIG. 5 in a sensing mode according to one embodiment of the present disclosure.

FIGS. 6A and to 6B are diagrams illustrating an example of a sensing operation for the pixel shown in FIG. 5 in the sensing mode.

In the sensing mode, adjacent sub-pixels of the same color that share the sensing line may be sensed alternately.

During a first sensing period, as shown in FIG. 6A, the pulse of the gate signal SCAN may be applied to the sub-pixels R1 to B2, and data voltages Vdata1, Vdata3, and Vdata5 for sensing may be applied to the first-first, second-first, and third-first sub-pixels R1, G1, and B1 to be synchronized therewith. At this time, a black grayscale voltage may be applied to the first-second, second-second, and third-second sub-pixels R2, G2, and B2 through data lines DL2, DL4, and DL6. During the first sensing period, the data voltages Vdata1, Vdata3, and Vdata5 for sensing are applied to the first nodes DTG of the first-first, second-first, and third-first sub-pixels R1, G1, and B1, and as a result, the driving transistors DR are turned on, causing the voltages of the second nodes DTS to rise, and consequently, the threshold voltages Vth of the driving transistors DR may be sensed. The sensing voltage is input to the ADC through the sensing line SL. During the first sensing period, a black grayscale voltage is applied to the first nodes DTG of the first-second, second-second, and third-second sub-pixels R2, G2, and B2, and therefore the driving transistors DR of these sub-pixels R2, G2, and B2 are in the off state.

Figure 6B:
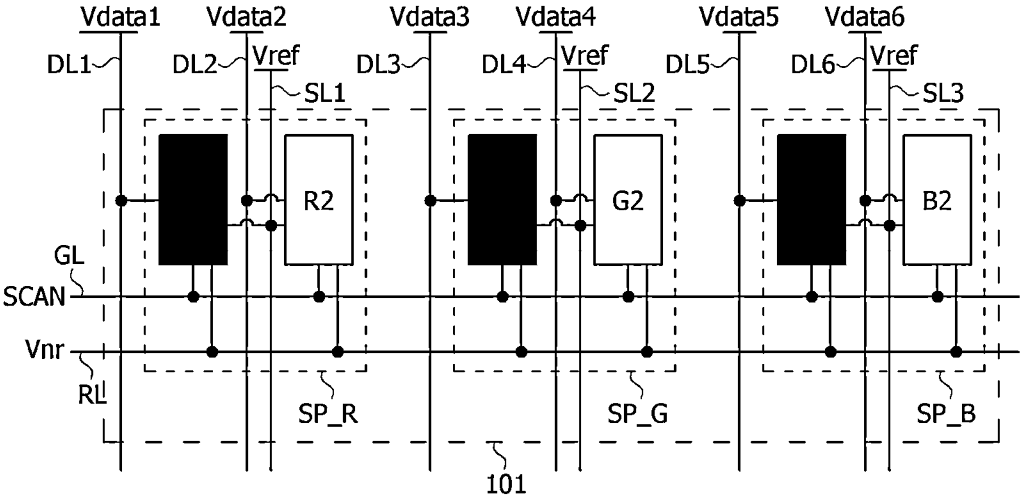

During a second sensing period, as shown in FIG. 6B, the pulse of the gate signal SCAN is applied to the sub-pixels R1 to B2, and data voltages Vdata2, Vdata4, and Vdata6 for sensing may be applied to the first-second, second-second, and third-second sub-pixels R2, G2, and B2 to be synchronized therewith. At this time, a black grayscale voltage may be applied to the first-first, second-first, and third-first sub-pixels R1, G1, and B1 through data lines DL1, DL3, and DL5. During the second sensing period, the data voltages Vdata2, Vdata4, and Vdata6 for sensing are applied to the first nodes DTG of the first-second, second-second, and third-second sub-pixels R2, G2, and B2, and as a result, the driving transistors DR are turned on, causing the voltages of the second nodes DTS to rise, and consequently, the threshold voltages of the driving transistors DR may be sensed. The sensing voltage is input to the ADC through the sensing line SL. During the second sensing period, a black grayscale voltage is applied to the first nodes DTG of the first-first, second-first, and third-first sub-pixels R1, G1, and B1, and therefore, the driving transistors DR of these sub-pixels R1, G1, and B1 are in the off state.

Figure 7:
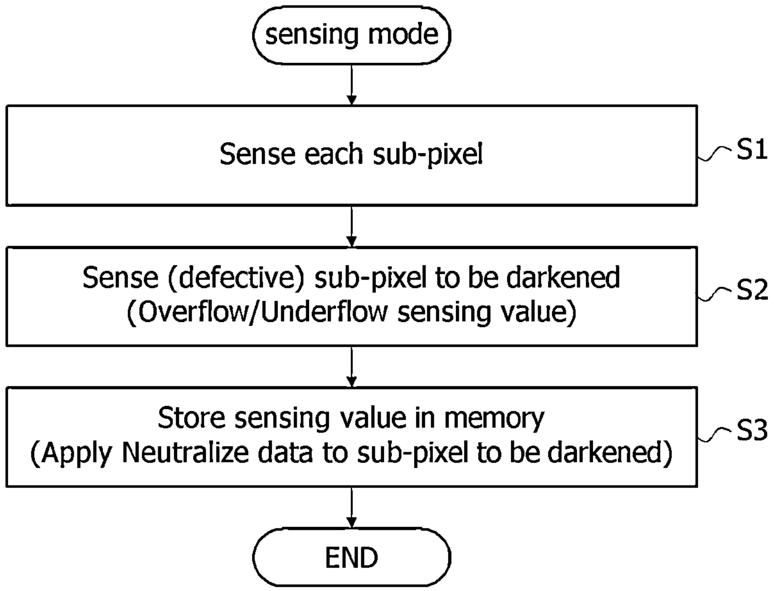
FIG. 7 is a diagram illustrating an example of a method of sensing a sub-pixel to be darkened according to one embodiment of the present disclosure.

FIG. 7 is a diagram illustrating an example of a method of sensing a sub-pixel to be darkened according to one embodiment of the present disclosure. The sub-pixel to be darkened may be sensed in real-time in the sensing mode, for example, in a power-off sequence (OFF RS), but is not limited thereto.

Referring to FIG. 7, the sensing circuit SC senses each of the sub-pixels in the sensing mode (S1).

The timing controller 130 receives the sensing data Dsen for each sub-pixel from the ADC of the sensing circuit SC and passes it to a lookup table memory. The lookup table memory may update a compensation value for each sub-pixel in the sensing mode. When the sense data Dsen is an overflow or an underflow outside the normal driving range of the sub-pixel, the timing controller 130 may determine that the sub-pixel is a sub-pixel to be darkened and record compensation data for the sub-pixel to be darkened into the lookup table memory as neutralize data so that the compensation value of the sub-pixel to be darkened is updated (S2 and S3). That is, the sub-pixel is to be darkened responsive to the sense data Dsen being less than or greater than a predetermined range of sensing values for the sub-pixel.

The timing controller 130 modulates or replaces the pixel data to be written to the sub-pixel to be darkened from the pixel data of the input image with the neutralize data and transmits it to the data driver 110. As a result, the neutralize voltage is applied to the sub-pixel to be darkened and the sub-pixel to be darkened does not emit light.

Figure 8:
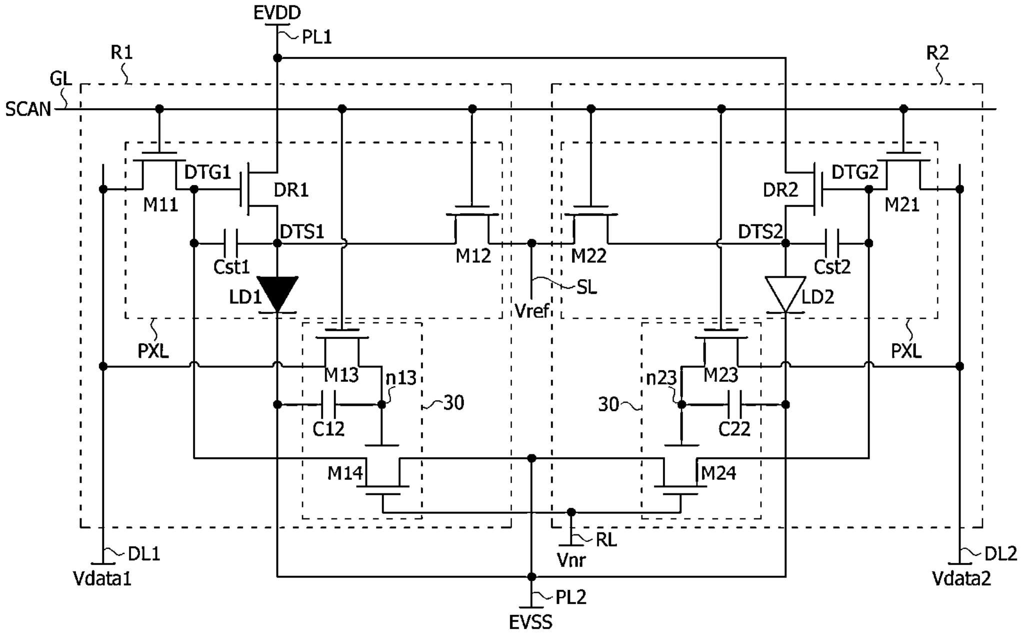
FIG. 8 is a circuit diagram illustrating first-first and first-second sub-pixels according to one embodiment of the present disclosure.

FIG. 8 is a circuit diagram illustrating first-first and first-second sub-pixels according to one embodiment of the present disclosure. In the following, an embodiment will be described under the assumption that the first-first sub-pixel R1 is a sub-pixel to be darkened and the first-second sub-pixel R2 is a normal sub-pixel. With respect to the pixel circuit illustrated in FIG. 8, descriptions that are redundant of the foregoing descriptions in FIG. 3 may be omitted. In FIG. 8, the sensing circuit is omitted.

Referring to FIG. 8, each of the first-first and first-second sub-pixels R1 and R2 includes a pixel circuit PXL and a pixel control circuit 30.

The pixel circuit PXL of the first-first sub-pixel R1 may include a first light-emitting element LD1, a first driving transistor DR1, a first-first capacitor Cst1, a first-first switch transistor M11, and a first-second switch transistor M12.

The first driving transistor DR1 includes a first electrode connected to the first power line PL1 to which the pixel power voltage EVDD is applied, a gate electrode connected to a first-first node DTG1, and a second electrode connected to a first-second node DTS1. The first-first capacitor Cst1 is connected between the first-first node DTG1 and the first-second node DTS1.

The first light-emitting element LD1 includes an anode electrode connected to the first-second node DTS1 and a cathode electrode connected to the second power line PL2 to which the ground voltage EVSS is applied.

When the first-first switch transistor M11 is turned on, a first data line DL1 is electrically connected to the first-first node DTG1. The first-first switch transistor M11 includes a first electrode connected to the first data line DL1, a gate electrode connected to the gate line GL to which the gate signal SCAN is applied, and a second electrode connected to the first-first node DTG1.

When the first-second switch transistor M12 is turned on, the first-second node DTS1 is electrically connected to the sensing line SL. The first-second switch transistor M12 includes a first electrode connected to the first-second node DTS1, a gate electrode to which the gate signal SCAN is applied, and a second electrode connected to the sensing line SL.

The pixel control circuit 30 of the first-first sub-pixel R1 may include a first-third switch transistor M13, a first-fourth switch transistor M14, and a first-second capacitor C12.

The first-third switch transistor M13 is connected to the first data line DL1 and a first-third node n13 and is turned on in response to the gate-on voltage of the gate signal SCAN. When the first-third switch transistor M13 is turned on, the first data line DL1 is electrically connected to the first-third node n13. The first-third switch transistor M13 includes a first electrode connected to the first data line DL1, a gate electrode to which the gate signal SCAN is applied, and a second electrode connected to the first-third node n13.

The first-fourth switch transistor M14 is connected to the first-first node DTG1 and the second power line PL2 to which the ground voltage EVSS is applied, and may be turned on/off according to the voltage of the first-third node n13 being applied to a second gate electrode of the first-fourth switch transistor M14. The first-fourth switch transistor M14 may be turned on when the neutralize voltage is applied to the first-third nodes n13 and turned off when the data voltage of the pixel data is applied to the first-third nodes n13. The neutralize voltage may be set to a voltage higher than the maximum voltage of the data voltage of the pixel data. That is, the neutralize voltage is set to a voltage that is greater than the maximum possible voltage of the data voltage range of the pixel data. When the first-fourth switch transistor M14 is turned on, the first-first node DTG1 may be electrically connected to the second power line PL2. The first-fourth switch transistor M14 includes a first electrode connected to the first-first node DTG1, a first gate electrode to which the neutralize reference voltage Vnr is applied, a second gate electrode connected to a first-third node n13, and a second electrode connected to the second power line PL2. The second gate electrode may be interpreted as a back gate electrode or back bias electrode, etc. The first-second capacitor C12 is connected between the first-third node n13 and the second power line PL2 to maintain the voltage of the first-third node n13 for a period of one frame.

The pixel circuit PXL of the first-second sub-pixels R2 may include a second light-emitting element LD2, a second driving transistor DR2, a second-first capacitor Cst2, a second-first switch transistor M21, and a second-second switch transistor M22.

The second driving transistor DR2 includes a first electrode connected to the first power line PL1, a gate electrode connected to a second-first node DTG2, and a second electrode connected to a second-second node DTS2. The second-first capacitor Cst2 is connected between the second-first node DTG2 and the second-second node DTS2. The second light-emitting element LD2 includes an anode electrode connected to the second-second node DTS2 and a cathode electrode connected to the second power line PL2.

The second-first switch transistor M21 includes a first electrode connected to a second data line DL2, a gate electrode to which the gate signal SCAN is applied, and a second electrode connected to the second-first node DTG2. The second-second switch transistor M22 includes a first electrode connected to the second-second node DTS2, a gate electrode to which the gate signal SCAN is applied, and a second electrode connected to the sensing line SL.

The pixel control circuit 30 of the first-second sub-pixels R2 may include a second-third switch transistor M23, a second-fourth switch transistor M24, and a second-second capacitor C22.

The second-third switch transistor M23 is connected between the second data line DL2 and a second-third node n23 and is turned on in response to the gate-on voltage of the gate signal SCAN. When the second-third switch transistor M23 is turned on, the second data line DL2 is electrically connected to the second-third node n23. The second-third switch transistor M23 includes a first electrode connected to the second data line DL2, a gate electrode to which the gate signal SCAN is applied, and a second electrode connected to the second-third node n23.

The second-fourth switch transistor M24 may be connected between the second-first node DTG2 and the second power line PL2 and may be turned/off according to the voltage of the second-third node n23. The second-fourth switch transistor M24 may be turned on when the neutralize voltage is applied to the second-third nodes n23 and turned off when the data voltage of the pixel data is applied to the second-third node n23. The second-fourth switch transistor M24 includes a first electrode connected to the second-first node DTG2, a first gate electrode to which the neutralize reference voltage Vnr is applied, a second gate electrode connected to a second-third node n23, and a second electrode connected to the second power line PL2. The second-second capacitor C22 is connected between the second-third node n23 and the second power line PL2 to maintain the voltage of the second-third node n23 for a period of one frame.

Figure 9:
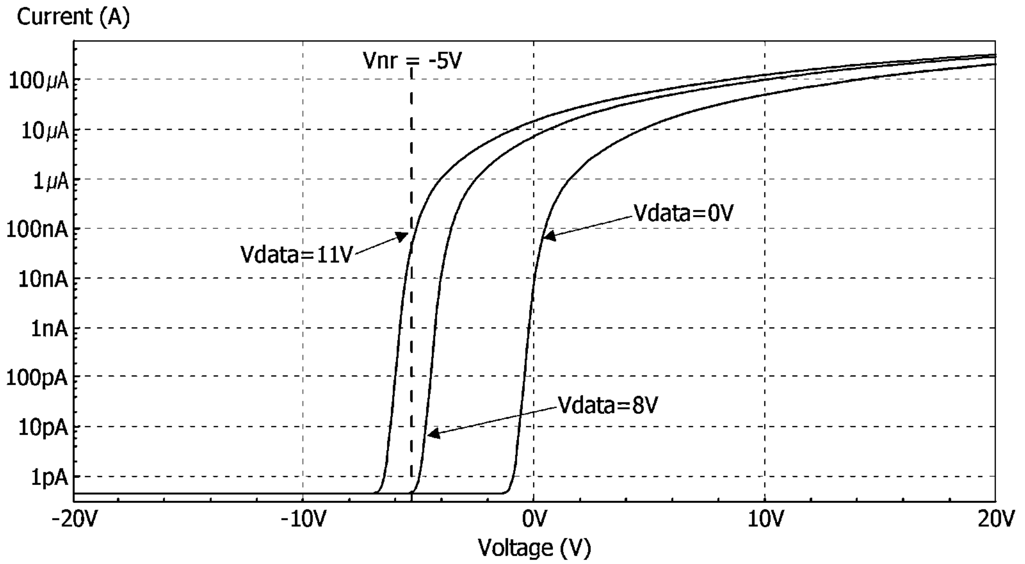
FIG. 9 is a diagram illustrating operation characteristics of the first-fourth and second-fourth switch transistors M14 and M24 shown in FIG. 8 according to one embodiment of the present disclosure.

FIG. 9 is a diagram illustrating operation characteristics of the first-fourth and second-fourth switch transistors M14 and M24 shown in FIG. 8. In FIG. 9, the x-axis is the gate voltage applied to the first gate electrodes of the first-fourth and second-fourth switch transistors M14 and M24, and the y-axis is the current flowing through the channels of the first-fourth and second-fourth switch transistors M14 and M24. In FIG. 9, the curves are the operating voltage and current characteristics that vary with the back bias voltage applied to the first-fourth and second-fourth switch transistors M14 and M24.

Referring to FIG. 9, a data voltage of pixel data for reproducing an input image from pixels may be a voltage in a dynamic range of 0 V to 8 V, but is not limited thereto. The neutralize voltage may be set to a voltage that is greater than the maximum voltage of the data voltage of the pixel data, for example, but not limited to 11 V. The data voltage of the pixel data and the neutralize voltage may be applied to the first-third and second-third nodes n13 and n23 as the back bias voltages applied to the second gate electrodes of the first-fourth and second-fourth switch transistors M14 and M24.

The first-fourth and second-fourth switch transistors M14 and M24 may have their threshold voltages shifted according to the back bias voltages applied to their second gate electrodes. For example, as illustrated in FIG. 9, the threshold voltage of the first-fourth and second-fourth switch transistors M14 and M24 may be lower when the data voltage of the pixel data is 8 V than when the data voltage of the pixel data is 0 V. The neutralize reference voltage Vnr may be set to, but not limited to, a constant voltage, e.g., −5 V, which allows the first-fourth and second-fourth switch transistors M14 and M24 not to be turned on at a data voltage of the pixel data, 0 V to 8 V, and which allows the first-fourth and second-fourth switch transistors M14 and M24 to be turned on at a neutralize voltage higher than the data voltage of the pixel data.

When the neutralize voltage is 11 V, the threshold voltages of the first-fourth and second-fourth switch transistors M14 and M24 are lowered to allow the first-fourth and second-fourth switch transistors M14 and M24 to turn on. When the first-fourth and second-fourth switch transistors M14 and M24 are turned on, the gate voltage of the driving transistors DR1 and DR2 is discharged to the second power line PL2, and thus the driving transistors DR1 and DR2 are not turned on. Accordingly, the sub-pixel to which the neutralize voltage is applied may be turned into a dark point because no current flows to the light-emitting elements LD1 and LD2 since the driving transistors DR1 and DR2 are respectively turned off.

Among the first-first and first-second sub-pixels R1 and R2 of the red sub-pixel SP_R, the first-first sub-pixel R1 may be a sub-pixel subject to be darkened and the first-second sub-pixel R2 may be a normal sub-pixel. In this case, the neutralize voltage is applied to the first data line DL1 and the data voltage of the pixel data is applied to the second data line DL2. As a result, the first-first sub-pixel R1 may be turned into the dark point, and the first-second sub-pixel may be emitted at a target luminance corresponding to the grayscale value of the pixel data.

Figure 10:
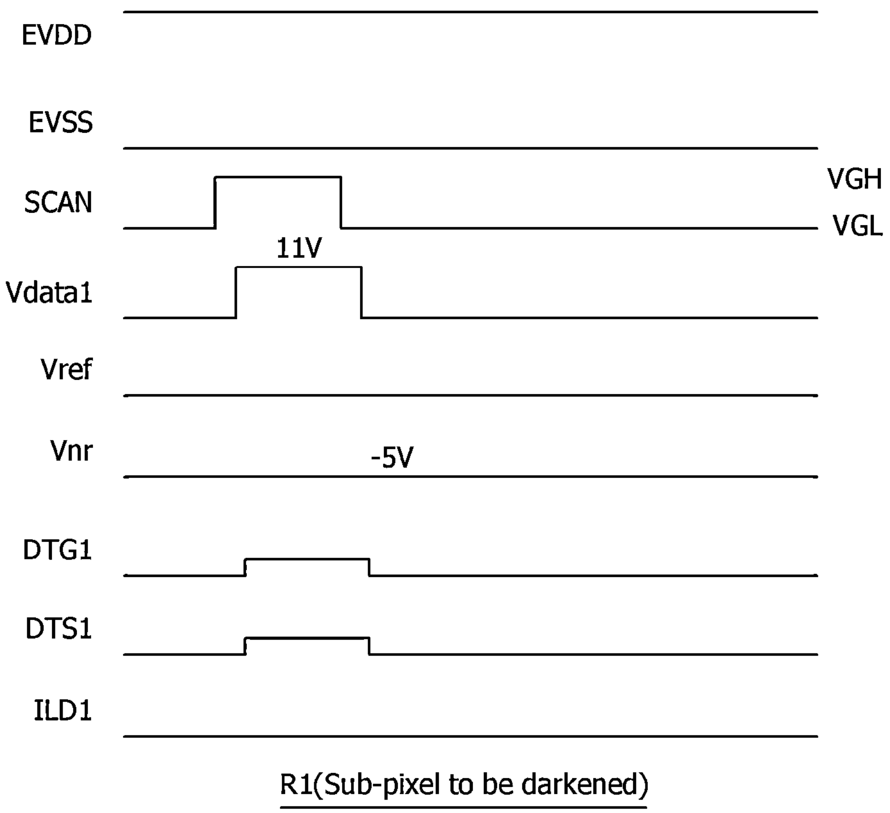
FIG. 10 is a diagram illustrating the voltages of the main nodes and the currents of the light-emitting elements that illustrates the operation of a sub-pixel to be darkened according to one embodiment of the present disclosure.

FIG. 10 is a diagram illustrating the voltages of the main nodes and the currents of the light-emitting elements that illustrates the operation of a sub-pixel to be darkened. In FIG. 10, "ILD1" denotes the current of the first light-emitting element.

Referring to FIG. 10, the first-third and first-fourth switch transistors M13 and M14 of the pixel control circuit 30 are turned on when the first data voltage Vdata1 applied to the first data line DL1 is at the neutralize voltage 11 V. The first-third switch transistor M13 may be turned on for one horizontal period in response to the gate-on voltage VGH of the gate signal SCAN, allowing the neutralize voltage to be transferred to the first-third node n13. The first-fourth switch transistor M14 may be turned on by shifting its threshold voltage to a voltage lower than 0 V by the neutralize voltage and may maintain the on state for one frame period with the voltage charged in the first-second capacitor C12. At this time, the first-first node DTG1 is connected to the second power line PL2 to which the ground voltage EVSS is applied through the first-fourth switch transistor M14. When the pixel control circuit 30 is driven due to the neutralize voltage, the first driving transistor DR1 is maintained in the off state, and therefore no current may flow to the first light-emitting element LD1. As a result, the first sub-pixel R1 is turned into a dark point.

In the first-first sub-pixel R1 that has been turned into the dark point, after the pulse of the gate signal SCAN is inverted to the gate-off voltage VGL, the voltage charged in the first-first capacitor Cst1 may be 0 V, and the voltages of the first-first and first-second nodes DTG1 and DTS1 may be 0 V.

Figure 11:
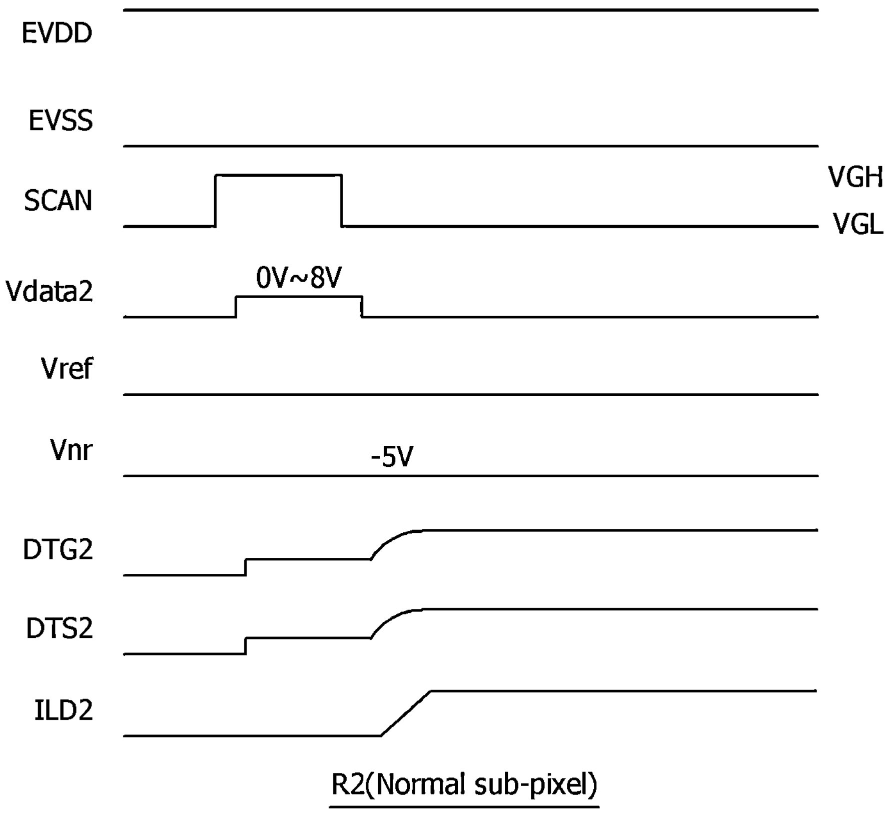
FIG. 11 is a diagram illustrating the voltages of the main nodes and the currents of the light-emitting elements that illustrates the operation of a normal sub-pixel according to one embodiment of the present disclosure.

FIG. 11 is a diagram illustrating the voltages of the main nodes and the currents of the light-emitting elements that illustrates the operation of a normal sub-pixel.

Referring to FIG. 11, when the second data voltage Vdata2 applied to the second data line DL2 is the data voltage of the pixel data, 0 V to 8 V, the second-fourth switch transistor M24 of the pixel control circuit 30 maintains the off state. The second-third switch transistor M23 may be turned on for one horizontal period in response to the gate-on voltage VGH of the gate signal SCAN, while the second-fourth switch transistor M24 is in the off state because its threshold voltage is not shifted to a voltage lower than 0 V. Therefore, the pixel control circuit 30 of the first-second sub-pixels R2 does not affect the normal operation of the pixel circuit PXL of the first-second sub-pixels R2.

In the first-second sub-pixel R2 to which the data voltage of the pixel data is applied, the second driving transistor DR2 may be turned on to generate a current ILD2 according to its gate-source voltage when the data voltage of the pixel data is applied to the second-first node DTG2. The second light-emitting element LD2 may be emitted by the current ILD2 from the second driving transistor DR2. After the pulse of the gate signal SCAN is inverted to the gate-off voltage VGL, the voltages of the second-first and second-second nodes DRG2 and DRS2 may rise and the current of the second light-emitting element LD2 may rise according to the data voltage charged in the second-first capacitor Cst2.

Figure 12:
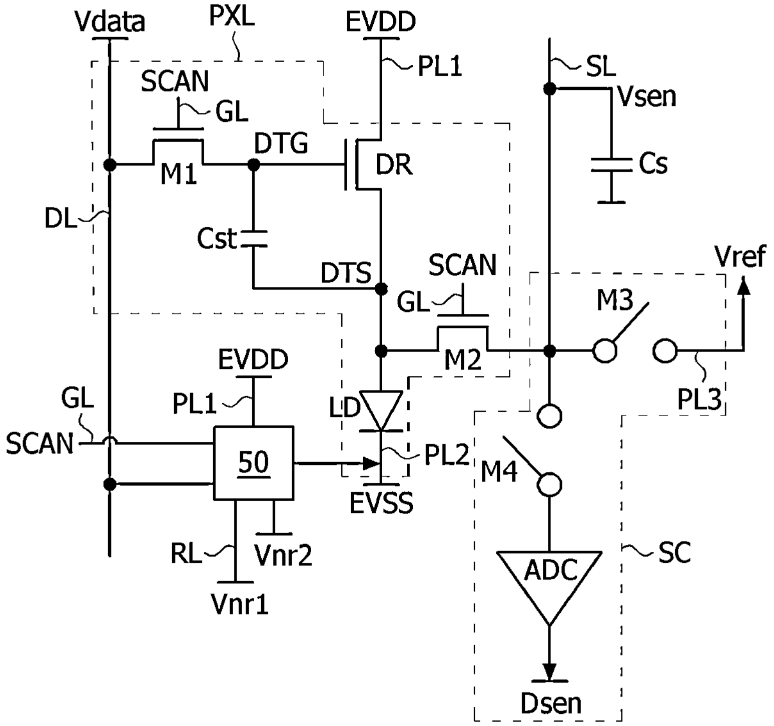
FIG. 12 is a circuit diagram illustrating a sub-pixel according to another embodiment of the present disclosure.

FIG. 12 is a circuit diagram illustrating a sub-pixel according to another embodiment of the present disclosure. In this embodiment, components that are substantially the same as the components in the sub-pixel shown in FIG. 3 will be designated with the same reference numerals, and detailed descriptions will be omitted.

Referring to FIG. 12, the sub-pixel may include a pixel circuit PXL, a sensing circuit SC, and a pixel control circuit 50.

The pixel control circuit 50 may allow a sub-pixel to be turned into a dark point by selectively disabling the pixel circuit PXL according to the voltage level of the data voltage. For example, the pixel control circuit 50 may be turned on in a sub-pixel to be darkened that is found to be defective in an inspection process before shipping a product or in a sub-pixel to be darkened that is detected by the sensing circuit SC after shipping the product, thereby controlling the driving transistor DR to be in the off state. On the other hand, the pixel control circuit 50 is disabled in a normal sub-pixel and does not have an effect on the driving of the normal sub-pixel.

The pixel control circuit 50 may receive the gate signal SCAN, a first neutralize reference voltage Vnr1, a second neutralize reference voltage Vnr2, and the pixel power voltage EVDD and may be connected to the data line DL. The pixel control circuit 50 is turned on to apply the pixel power voltage EVDD to the cathode electrode of the light-emitting element LD when the neutralize voltage is applied to the data line DL. In this case, the cathode voltage of the light-emitting element LD rises to the pixel supply voltage EVDD, which causes a reverse bias to be applied to the light-emitting element, resulting in no current flowing to the light-emitting element LD. Accordingly, the sub-pixel in which the pixel control circuit 50 is driven may be turned into the dark point.

Figure 13:
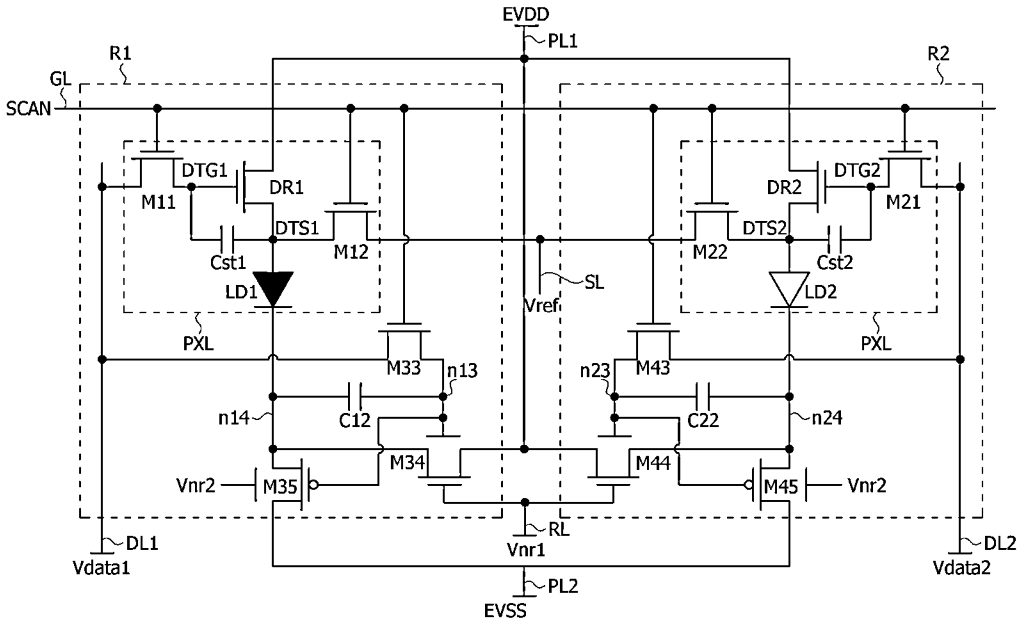
FIG. 13 is a circuit diagram illustrating first-first and first-second sub-pixels according to another embodiment of the present disclosure.

FIG. 13 is a circuit diagram illustrating an example of first-first and first-second sub-pixels according to another embodiment of the present disclosure. In this embodiment, redundant descriptions will be omitted for the components that are substantially the same as the sub-pixel shown in FIG. 12. In FIG. 13, the sensing circuit is omitted.

Referring to FIG. 13, each of the first-first and first-second sub-pixels R1 and R2 includes a pixel circuit PXL and a pixel control circuit 50.

The first light-emitting element LD1 includes an anode electrode connected to the first-second node DTS1 and a cathode electrode connected to a first-fourth node n14. The second light-emitting element LD2 includes an anode electrode connected to the second-second node DTS2 and a cathode electrode connected to a second-fourth node n24.

The pixel control circuit 50 of the first-first sub-pixel R1 may include a first-third switch transistor M33, a first-fourth switch transistor M34, a first-fifth switch transistor M35, and the first-second capacitor C12. The first-third switch transistor M33 and the first-fourth switch transistor M34 may be implemented as n-channel transistors, and the first-fifth switch transistor M35 may be implemented as a p-channel transistor, but are not limited thereto.

When the first-third switch transistor M33 is turned on, the first data line DL1 is electrically connected to the first-third node n13. The first-third switch transistor M33 includes a first electrode connected to the first data line DL1, a gate electrode to which the gate signal SCAN is applied, and a second electrode connected to the first-third node n13.

The first-fourth switch transistor M34 is connected to the first-fourth node n14 and the first power line PL1 to which the pixel power voltage EVDD is applied, and may be turned on/off according to the voltage of the first-third node n13. The first-fourth switch transistor M34 may be turned on when the neutralize voltage is applied to the first-third nodes n13 and turned off when the data voltage of the pixel data is applied to the first-third nodes n13. The neutralize voltage may be set to a voltage higher than the maximum voltage of the data voltage of the pixel data. When the first-fourth switch transistor M34 is turned on, the cathode electrode of the first light-emitting element LD1 may be electrically connected to the first power line PL1 through the first-fourth switch transistor M34. The first-fourth switch transistor M34 includes a first electrode connected to the first-fourth node n14, a first gate electrode to which the first neutralize reference voltage Vnr1 is applied, a second gate electrode connected to the first-third node n13, and a second electrode connected to the first power line PL1. The first-second capacitor C12 is connected between the first-third node n13 and the first-fourth node n14.

The first-fifth switch transistor M35 may be connected between the first-fourth node n14 and the second power line PL2 and may be turned on/off according to the voltage of the first-third node n13. The first-fifth switch transistor M35 may be turned off when the neutralize voltage is applied to the first-third nodes n13 and turned on when the data voltage of the pixel data is applied to the first-third node n13. When the first-fifth switch transistor M35 is turned on, the cathode electrode of the first light-emitting element LD1 may be electrically connected to the second power line PL2 through the first-fifth switch transistor M35. When the first-fifth switch transistor M35 is turned off, the cathode electrode of the first light-emitting element LD1 may be electrically connected to the first power line PL1 through the first-fourth switch transistor M34. The first-fifth switch transistor M35 includes a first electrode connected to the first-fourth node n14, a first gate electrode connected to the first-third node n13, a second gate electrode to which the second neutralize reference voltage Vnr2 is applied, and a second electrode connected to the second power line PL2.

The pixel control circuit 50 of the first-second sub-pixel R2 may include a second-third switch transistor M43, a second-fourth switch transistor M44, a second-fifth switch transistor M45, and the second-second capacitor C22. The second-third switch transistor M43 and the second-fourth switch transistor M44 may be implemented as n-channel transistors, and the second-fifth switch transistor M45 may be implemented as a p-channel transistor, but are not limited thereto.

The second-third switch transistor M43 includes a first electrode connected to the second data line DL2, a gate electrode to which the gate signal SCAN is applied, and a second electrode connected to the second-third node n23. The second-fourth switch transistor M44 includes a first electrode connected to a second-fourth node n24, a first gate electrode to which the first neutralize reference voltage Vnr1 is applied, a second gate electrode connected to the second-third node n23, and a second electrode connected to the first power line PL1. The second-second capacitor C22 is connected between the second-third node n23 and the second-fourth node n24.

The second-fifth switch transistor M45 includes a first electrode connected to the second-fourth node n24, a first gate electrode connected to the second-third node n23, a second gate electrode to which the second neutralize reference voltage Vnr2 is applied, and a second electrode connected to the second power line PL2.

The first neutralize reference voltage Vnr1 may be set to, but is not limited to, a negative constant voltage, e.g., −5 V, which allows the first-fourth and second-fourth switch transistors M34 and M44 to maintain the off state at a data voltage of pixel data, 0 V to 8 V, applied to the normal sub-pixel, and which allows the first-fourth and second-fourth switch transistors M34 and M44 to be turned on at a neutralize voltage, 11 V, applied to the sub-pixel to be darkened.

The second neutralize reference voltage Vnr2 may be set to, but is not limited to, a positive constant voltage, e.g., a voltage equal to or greater than 11 V, which allows the first-fifth and second-fifth switch transistors M35 and M45 to maintain the on state at a data voltage of pixel data, 0 V to 8 V, applied to a normal sub-pixel, and which allows the first-fifth and second-fifth switch transistors M35 and M45 to be turned off at a neutralize voltage, 11 V, applied to the sub-pixel to be darkened.

When the neutralize voltage is applied to the first data line DL1, the first-third switch transistor M33 turns on in response to the gate-on voltage VGH of the gate signal SCAN synchronized with the neutralize voltage. At the same time, as shown by the dotted line shown in FIG. 14, the first-fourth switch transistor M34 may be turned on because its threshold voltage is lowered according to the neutralize voltage applied to the first-third node n13, and the first-fifth switch transistor M35 may be turned off. The first-fifth switch transistor M35 may be turned off because its threshold voltage is lowered when the neutralize voltage is applied. In this case, the cathode voltage of the light-emitting element LD1 rises to the pixel supply voltage EVDD, resulting in no current flowing to the light-emitting element LD1. Consequently, the first sub-pixel R1 may be turned into a dark point.

When the data voltage of pixel data is applied to the second data line DL2, the second-third switch transistor M43 is turned on in response to the gate-on voltage VGH of the gate signal SCAN synchronized with the data voltage of the pixel data, whereas the second-fourth switch transistor M44 maintain the off state and the second-fifth switch transistor M45 maintains the on state. Accordingly, the pixel control circuit 50 of the first-second sub-pixels R2 does not affect the driving of the pixel circuit PXL of the first-second sub-pixels R2, and therefore, current may flow to the second light-emitting element LD2.

Figure 14:
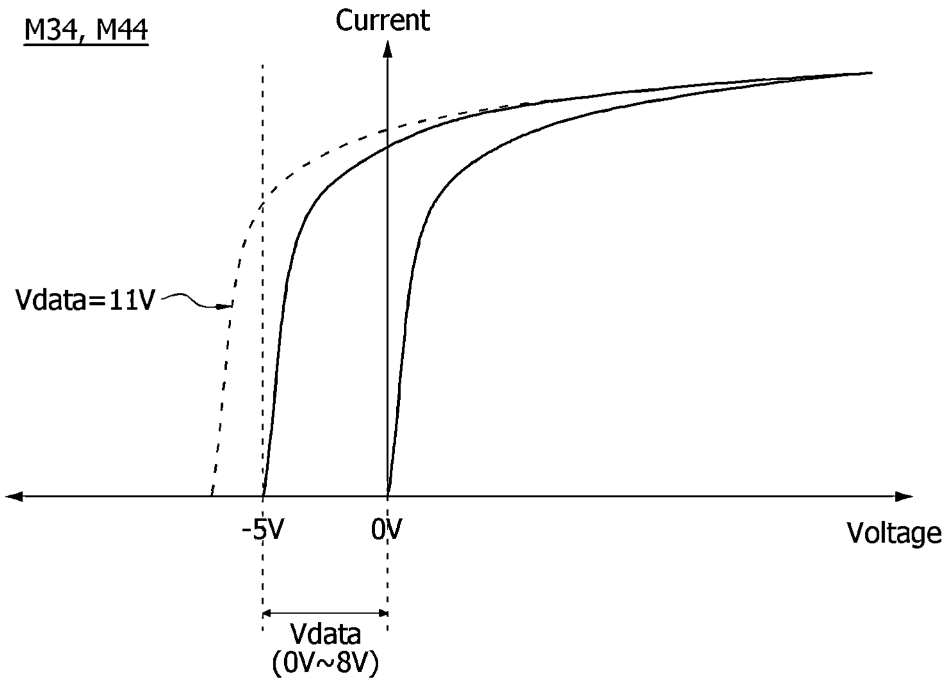
FIG. 14 is a diagram illustrating operation characteristics of the switch transistors in the pixel control circuit shown in FIG. 13 according to one embodiment of the present disclosure.
Figure 14:
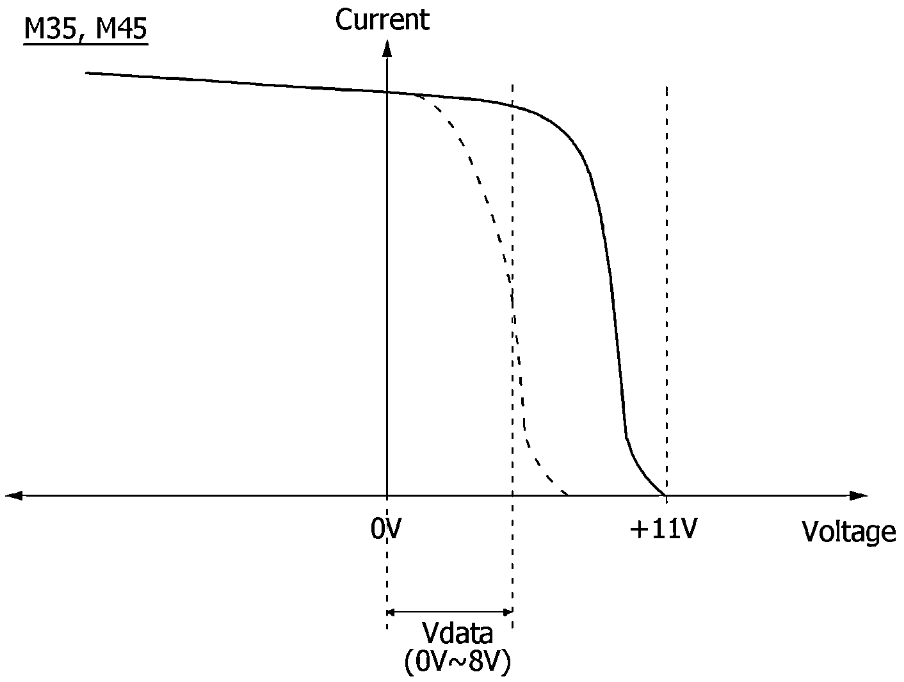

FIG. 14 is a diagram illustrating operation characteristics of the switch transistors in the pixel control circuit shown in FIG. 13. In FIG. 14, the x-axis is the voltage applied to the first gate electrodes of the switch transistors M34, M35, M44, and M45, and the y-axis is the current flowing through the channels of the switch transistors M34, M35, M44, and M45. 'Vdata' denotes a back bias voltage applied to the second gate electrodes of the switch transistors M34, M35, M44, and M45.

Referring to FIG. 14, the first-fourth and second-fourth switch transistors M34 and M44 may have their threshold voltages shifted according to the back bias voltages applied to their second gate electrodes. For example, the neutralize reference voltage Vnr1 applied as the back bias voltage may be set to, but not limited to, a constant voltage, e.g., −5 V, which allows the first-fourth and second-fourth switch transistors M34 and M34 not to be turned on at a data voltage of the pixel data, 0 V to 8 V, and which allows the first-fourth and second-fourth switch transistors M34 and M34 to be turned on at a neutralize voltage higher than the data voltage of the pixel data.

When the neutralize voltage is applied to the second gate electrodes of the first-fourth and second-fourth switch transistors M34 and M44, the threshold voltages of the first-fourth and second-fourth switch transistors M34 and M44 are lowered to allow the first-fourth and second-fourth switch transistors M34 and M44 to turn on.

The first-fifth and second-fifth switch transistors M35 and M45 may have their threshold voltages shifted according to the back bias voltages applied to their second gate electrodes. For example, the threshold voltages of the first-fifth and second-fifth switch transistors M35 and M45 may rise by the second neutralize reference voltage Vnr2 applied as a back bias voltage. The first-fifth and second-fifth switch transistors M35 and M45, whose threshold voltages are raised by the second neutralize reference voltage Vnr2, remain in the on state when a data voltage of pixel data, 0 V to 8 V, is applied to their first gate electrodes. On the other hand, when a neutralize voltage higher than the data voltage of the pixel data is applied to the first gate electrodes of the first-fifth and second-fifth switch transistors M35 and M45, the threshold voltages of the first-fifth and second-fifth switch transistors M35 and M45 may be lowered, causing the first-fifth and second-fifth switch transistors M35 and M45 to turn off.

According to one or more embodiments of the present disclosure, the display device may be applied to mobile devices, video phones, smart watches, watch phones, wearable device, foldable device, rollable device, bendable device, flexible device, curved device, sliding device, variable device, electronic organizer, electronic books, portable multimedia players (PMPs), personal digital assistants (PDAs), MP3 players, mobile medical devices, desktop PCs, laptop PCs, netbook computers, workstations, navigations, vehicle navigations, vehicle display devices, vehicle devices, theater devices, theater display devices, televisions, wallpaper devices, signage devices, game devices, laptops, monitors, cameras, camcorders, and home appliances, etc. Additionally, the display apparatus according to one or more embodiments of the present disclosure may be applied to organic light emitting devices or inorganic light emitting devices.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display panel comprising:

a plurality of data lines;

a plurality of gate lines intersecting the plurality of data lines;

a plurality of power lines; and a plurality of pixels, each of the plurality of pixels including a plurality of sub-pixels, wherein the plurality of sub-pixels includes:

a sub-pixel of a first color including a primary first sub-pixel and a secondary first sub-pixel, the sub-pixel connected to a first data line of the plurality of data lines and a second data line of the plurality of data lines;

a pixel control circuit of the primary first sub-pixel configured to disable a pixel circuit of the primary first sub-pixel according to a voltage from the first data line; and a pixel control circuit of the secondary first sub-pixel configured to disable a pixel circuit of the secondary first sub-pixel according to a voltage from the second data line, wherein the primary first sub-pixel is disabled according to the voltage from the first data line that is different from the voltage from the second data line when the primary first sub-pixel is defective.

2. The display panel of claim 1, wherein the plurality of sub-pixels included in each of the plurality of pixels further comprise:

a sub-pixel of a second color that includes a primary second sub-pixel and a secondary second sub-pixel; and a sub-pixel of third color that includes a primary third sub-pixel and a secondary third sub-pixel, wherein each of the primary first sub-pixel, the secondary first sub-pixel, the primary second sub-pixel, the secondary second sub-pixel, the primary third sub-pixel, and the secondary third sub-pixel includes a respective pixel circuit and a respective pixel control circuit.

3. The display panel of claim 2, wherein the pixel circuit of the primary first sub-pixel includes:

a first light-emitting element;

a first driving transistor including a first electrode connected to a first power line from the plurality of power lines to which a pixel power voltage is applied, a gate electrode connected to a first node of the primary first sub-pixel, and a second electrode connected to a second node of the primary first sub-pixel;

a first switch transistor of the primary first sub-pixel that is configured to electrically connect the first data line from the plurality of data lines to the first node of the primary first sub-pixel in response to a gate signal;

a second switch transistor of the primary first sub-pixel that is configured to supply a reference voltage to the second node of the primary first sub-pixel in response to the gate signal; and a first capacitor of the primary first sub-pixel that is connected to the first node and the second node of the primary first sub-pixel, wherein the first light-emitting element includes an anode electrode connected to the second node of the primary first sub-pixel and a cathode electrode connected to a second power line from the plurality of power lines to which a ground voltage is applied, wherein the pixel circuit of the secondary first sub-pixel includes:

a second light-emitting element;

a second driving transistor including a first electrode connected to the first power line, a gate electrode connected to a first node of the secondary first sub-pixel, and a second electrode connected to a second node of the secondary first sub-pixel;

a first switch transistor of the secondary first sub-pixel that is configured to electrically connect the second data line from the plurality of data lines to the first node of the secondary first sub-pixel in response to the gate signal;

a second switch transistor of the secondary first sub-pixel that is configured to supply the reference voltage to the second node of the secondary first sub-pixel in response to the gate signal; and a first capacitor of the secondary first sub-pixel that is connected to the first node and the second node of the secondary first sub-pixel, and wherein the second light-emitting element includes an anode electrode connected to the second node of the secondary first sub-pixel and a cathode electrode connected to the second power line.

4. The display panel of claim 3, wherein:

the first light-emitting element emits light responsive to a pixel driving voltage being applied to the first data line and the second light-emitting element emits light responsive to the pixel driving voltage being applied to the second data line, the pixel control circuit of the primary first sub-pixel is configured to disable the pixel circuit of the primary first sub-pixel by electrically connecting the first node of the primary first sub-pixel to the second power line responsive to a neutralize voltage that is greater than a maximum possible voltage of the pixel driving voltage being applied to the first data line, and the pixel control circuit of the secondary first sub-pixel is configured to disable the pixel circuit of the secondary first sub-pixel by electrically connecting the first node of the secondary first sub-pixel to the second power line responsive to the neutralize voltage being applied to the second data line.

5. The display panel of claim 3, further comprising:

a neutralize reference voltage line to which a neutralize reference voltage is applied, wherein the pixel control circuit of the primary first sub-pixel includes:

a third switch transistor of the primary first sub-pixel that includes a first electrode connected to the first data line, a gate electrode to which the gate signal is applied, and a second electrode connected to a third node of the primary first sub-pixel;

a fourth switch transistor of the primary first sub-pixel that includes a first electrode connected to the first node of the primary first sub-pixel, a first gate electrode that is connected to the neutralize reference voltage line to which the neutralize reference voltage is applied, a second gate electrode connected to the third node of the primary first sub-pixel, and a second electrode connected to the second power line; and a second capacitor of the primary first sub-pixel that is connected to the third node of the primary first sub-pixel and the second power line, and wherein the pixel control circuit of the secondary first sub-pixel includes:

a third switch transistor of the secondary first sub-pixel that includes a first electrode connected to the second data line, a gate electrode to which the gate signal is applied, and a second electrode connected to a third node of the secondary first sub-pixel;

a fourth switch transistor of the secondary first sub-pixel that includes a first electrode connected to the first node of the secondary first sub-pixel, a first gate electrode that is connected to the neutralize reference voltage line to which the neutralize reference voltage is applied, a second gate electrode connected to the third node of the secondary first sub-pixel, and a second electrode connected to the second power line; and a second capacitor of the secondary first sub-pixel that is connected to the third node of the secondary first sub-pixel and the second power line.

6. The display panel of claim 3, wherein:

the first light-emitting element emits light responsive to a pixel driving voltage being applied to the first data line and the second light-emitting element emits light responsive to the pixel driving voltage being applied to the second data line, the pixel control circuit of the primary first sub-pixel is configured to disable the pixel circuit of the primary first sub-pixel by electrically connecting the cathode electrode of the first light-emitting element to the first power line responsive to a neutralize voltage that is greater than a maximum possible voltage of the pixel driving voltage being applied to the first data line, and the pixel control circuit of the secondary first sub-pixel is configured to disable the pixel circuit of the secondary first sub-pixel by electrically connecting the cathode electrode of the second light-emitting element to the first power line responsive to the neutralize voltage is applied to the second data line.

7. The display panel of claim 3, wherein the pixel control circuit of the primary first sub-pixel includes:

a third switch transistor of the primary first sub-pixel that includes a first electrode connected to the first data line, a gate electrode to which the gate signal is applied, and a second electrode connected to a third node of the primary first sub-pixel that;

a fourth switch transistor of the primary first sub-pixel that includes a first electrode connected to the cathode electrode of the first light-emitting element, a first gate electrode to which a first neutralize reference voltage is applied, a second gate electrode connected to the third node of the primary first sub-pixel, and a second electrode connected to the first power line;

a fifth switch transistor of the primary first sub-pixel that includes a first electrode connected to a fourth node of the primary first sub-pixel that, a first gate electrode connected to the third node of the primary first sub-pixel, a second gate electrode to which a second neutralize reference voltage is applied, and a second electrode connected to a second power line from the plurality of power lines to which a ground voltage is applied; and a second capacitor of the primary first sub-pixel that is connected to the third node and the fourth node of the primary first sub-pixel, and wherein the pixel control circuit of the secondary first sub-pixel includes:

a third switch transistor of the secondary first sub-pixel that includes a first electrode connected to the second data line, a gate electrode to which the gate signal is applied, and a second electrode connected to a third node of the secondary first sub-pixel;

a fourth switch transistor of the secondary first sub-pixel that includes a first electrode connected to the cathode electrode of the second light-emitting element, a first gate electrode to which the first neutralize reference voltage is applied, a second gate electrode connected to the third node of the secondary first sub-pixel, and a second electrode connected to the first power line;

a fifth switch transistor of the secondary first sub-pixel that includes a first electrode connected to the fourth node of the secondary first sub-pixel, a first gate electrode connected to the third node of the secondary first sub-pixel, a second gate electrode to which the second neutralize reference voltage is applied, and a second electrode connected to the second power line; and a second capacitor of the secondary first sub-pixel that is connected to the third node and the fourth node of the secondary first sub-pixel.

8. The display panel of claim 7, wherein:

the first neutralize reference voltage is a negative voltage, and the second neutralize reference voltage is a positive voltage that is greater than the negative voltage, each of the third switch transistor and the fourth switch transistor of the primary first sub-pixel and the third switch transistor and the fourth switch transistor of the secondary first sub-pixel is an n-channel transistor, and each of the fifth switch transistor of the primary first sub-pixel and the fifth switch transistor of the secondary first sub-pixel is a p-channel transistor.

9. The display panel of claim 3, wherein the primary first sub-pixel further includes a first sensing circuit connected to a sensing line to which the reference voltage is applied, the first sensing circuit configured to sense an electrical characteristic of the first driving transistor, and wherein the secondary first sub-pixel further includes a second sensing circuit connected to the sensing line, the second sensing circuit configured to sense an electrical characteristic of the second driving transistor.

10. A display device comprising:

a display panel including a plurality of data lines, a plurality of gate lines that intersect the plurality of data lines, a plurality of power lines, and a plurality of pixels that each include a plurality of sub-pixels;

a data driver configured to output to the plurality of data lines at least one of a pixel driving voltage to drive the plurality of pixels to display an image and a neutralize voltage to disable at least one of the plurality of sub-pixels;

a gate driver configured to supply a gate signal to the plurality of gate lines, wherein the plurality of sub-pixels includes:

a sub-pixel of a first color including a primary first sub-pixel and a secondary first sub-pixel, the sub-pixel connected to a first data line of the plurality of data lines and a second data line of the plurality of data lines;

a pixel control circuit of the primary first sub-pixel configured to disable a pixel circuit of the primary first sub-pixel according to a voltage from the first data line; and a pixel control circuit connected to the pixel circuit, the pixel control circuit of the secondary first sub-pixel configured to disable a pixel circuit of the secondary first sub-pixel according to a voltage from the second data line, wherein the primary first sub-pixel is disabled according to the voltage from the first data line that is different from the voltage from the second data line when the primary first sub-pixel is defective.

11. The display device of claim 10, wherein the plurality of sub-pixels further includes:

a sub-pixel of a second color that includes a primary second sub-pixel connected to a third data line and a secondary second sub-pixel connected to a fourth data line; and a sub-pixel of a third color that includes a primary third sub-pixel connected to a fifth data line and a secondary third sub-pixel connected to a sixth data line, and wherein each of the primary second sub-pixel, the secondary second sub-pixel, the primary third sub-pixel, and the secondary third sub-pixel includes a respective pixel circuit and a respective pixel control circuit.

12. The display device of claim 11, wherein the primary first sub-pixel includes:

a first light-emitting element; and a first driving transistor configured to drive the first light-emitting element, wherein the secondary first sub-pixel includes:

a second light-emitting element; and a second driving transistor configured to drive the second light-emitting element, wherein:

the first light-emitting element emits light responsive to the pixel driving voltage being applied to the first data line and the second light-emitting element emits light responsive to the pixel driving voltage being applied to the second data line, the pixel control circuit of the primary first sub-pixel is configured to disable the pixel circuit of the primary first sub-pixel responsive to the neutralize voltage that is greater than a maximum possible voltage of the pixel driving voltage being applied to the first data line, and the pixel control circuit of the secondary first sub-pixel is configured to disable the pixel circuit of the secondary first sub-pixel responsive to the neutralize voltage being applied to the second data line.

13. The display device of claim 12, wherein the pixel control circuit of the primary first sub-pixel is configured to disable the pixel circuit of the primary first sub-pixel by supplying a ground voltage to a gate electrode of the first driving transistor responsive to the neutralize voltage being applied to the first data line, and the pixel control circuit of the secondary first sub-pixel is configured to disable the pixel circuit of the secondary first sub-pixel by supplying the ground voltage to a gate electrode of the second driving transistor responsive to the neutralize voltage being applied to the second data line.

14. The display device of claim 12, wherein the pixel control circuit of the primary first sub-pixel is configured to disable the pixel circuit of the primary first sub-pixel by supplying a pixel power voltage to a cathode electrode of the first light-emitting element responsive to the neutralize voltage being applied to the first data line, and the pixel control circuit of the secondary first sub-pixel is configured to disable the pixel circuit of the secondary first sub-pixel by supplying the pixel power voltage to a cathode electrode of the second light-emitting element responsive to the neutralize voltage being applied to the second data line.

15. The display device of claim 10, further comprising:

a sensing circuit connected to a driving transistor disposed in each of the plurality of sub-pixels and configured to sense an electrical characteristic of the driving transistor for each of the plurality of sub-pixels; and a memory configured to store sensing data obtained from the sensing circuit, wherein neutralize data is stored in the memory in response to the sensing data of an overflow value that is greater than a normal driving range of the sub-pixel or and underflow value that is less than the normal driving range of the sub-pixel.

16. A display device comprising:

a display panel including a plurality of data lines, a plurality of gate lines that intersect the plurality of data lines, a plurality of power lines, and a plurality of pixels that each include a plurality of sub-pixels;

a data driver configured to output to the plurality of data lines at least one of a pixel driving voltage to drive the plurality of pixels to display an image and a neutralize voltage to disable at least one of the plurality of sub-pixels;

a gate driver configured to supply a gate signal to the plurality of gate lines, wherein a sub-pixel of a first color from the plurality of sub-pixels includes:

a primary first sub-pixel and a secondary first sub-pixel, the sub-pixel connected to a first data line of the plurality of data lines and a second data line of the plurality of data lines;

a pixel control circuit of the primary first sub-pixel configured to disable configured to disable one of a driving transistor of the primary first sub-pixel or a light emitting element of the primary first sub-pixel according to a voltage from the first data line; and a pixel control circuit of the secondary first sub-pixel configured to disable one of a driving transistor of the secondary first sub-pixel or a light emitting element of the secondary first sub-pixel according to a voltage from the second data line, wherein one of the driving transistor of the primary first sub-pixel or the light emitting element of the primary first sub-pixel is disabled according to the voltage from the first data line that is different from the voltage from the second data line when the primary first sub-pixel is defective.

17. The display device of claim 16, wherein the light emitting element of the primary first sub-pixel emits light responsive to the pixel driving voltage being applied to the first data line.

18. The display device of claim 16, wherein the neutralize voltage is greater than a maximum possible voltage of the pixel driving voltage.

19. The display device of claim 16, wherein the pixel control circuit of the primary first sub-pixel is configured to disable the driving transistor of the primary first sub-pixel by supplying a ground voltage to a gate electrode of the driving transistor of the primary first sub-pixel responsive to the neutralize voltage being applied to the first data line.

20. The display device of claim 16, wherein the pixel control circuit of the primary first sub-pixel is configured to disable the light emitting element of the primary first sub-pixel by supplying a pixel power voltage that is supplied to a cathode electrode of the light emitting element of the primary first sub-pixel responsive to the neutralize voltage being applied to the first data line.

21. The display device of claim 16, wherein the plurality of sub-pixels included in each of the plurality of pixels further comprise:

a sub-pixel of a second color that includes a primary second sub-pixel connected to a third data line from the plurality of data lines and a secondary second sub-pixel connected to a fourth data line from the plurality of data lines; and a sub-pixel of a third color that includes a primary third sub-pixel connected to a fifth data line from the plurality of data lines and a secondary third sub-pixel connected to a sixth data line from the plurality of data lines.

* * * * *